(12) United States Patent
Harada

(10) Patent No.: US 9,082,404 B2
(45) Date of Patent: Jul. 14, 2015

(54) RECOGNIZING DEVICE, COMPUTER-READABLE RECORDING MEDIUM, RECOGNIZING METHOD, GENERATING DEVICE, AND GENERATING METHOD

(75) Inventor: Shouji Harada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 440 days.

(21) Appl. No.: 13/586,533

(22) Filed: Aug. 15, 2012

(65) Prior Publication Data

US 2013/0096918 A1 Apr. 18, 2013

(30) Foreign Application Priority Data

Oct. 12, 2011 (JP) ................. 2011-225344

(51) Int. Cl.
*G10L 15/00* (2013.01)
*G10L 21/00* (2013.01)
*G10L 25/00* (2013.01)
*G10L 15/04* (2013.01)
*G10L 15/26* (2006.01)
(Continued)

(52) U.S. Cl.
CPC ................. *G10L 15/19* (2013.01); *G10L 15/10* (2013.01); *G10L 2015/027* (2013.01)

(58) Field of Classification Search
CPC .............. G06F 17/2785; G06F 17/289; G06F 17/2735; G06F 9/4448; G10L 15/22; G10L 15/265; G10L 15/187; G10L 15/063; G10L 15/08; G10L 13/08; G10L 15/00; G10L 15/30; G10L 15/02; G10L 17/005; H05K 999/99

USPC ............ 704/251, 249, 254, 9, 257, 231, 235, 704/275, 266, 243, 252, 270, 2, 246, 236, 704/10, 255, 270.1, 239, 240, 8

See application file for complete search history.

(56) References Cited

U.S. PATENT DOCUMENTS 5,794,177 A * 8/1998 Carus et al. ........................ 704/9
5,799,273 A * 8/1998 Mitchell et al. ................ 704/235
(Continued)

FOREIGN PATENT DOCUMENTS

JP 10-97286 A 4/1998
JP 2001-343994 A 12/2001
(Continued)

OTHER PUBLICATIONS

Japanese Office Action mailed Jan. 20, 2015 for corresponding Japanese Patent Application No. 2011-225344, with Partial English Translation, 7 pages.

*Primary Examiner* — Pierre-Louis Desir
*Assistant Examiner* — Anne Thomas-Homescu
(74) *Attorney, Agent, or Firm* — Fujitsu Patent Center

(57) ABSTRACT

A recognizing device includes a memory and a processor coupled to the memory. The memory stores words included in a text and positional information indicating a position of the words in the text. The processor executes a process including comparing an input voice signal with reading information of a character string that connects a plurality of words stored in the memory to calculate a similarity; calculating a connection score indicating a proximity between the plurality of connected words based on positional information of the words stored in the memory; and determining a character string corresponding to the voice signal based on the similarity and the connection score.

10 Claims, 22 Drawing Sheets

(51) Int. Cl.
*G10L 15/06* (2013.01)
*G10L 17/00* (2013.01)
*G10L 15/28* (2013.01)
*G06F 17/28* (2006.01)
*G06F 17/27* (2006.01)
*G06F 17/21* (2006.01)
*G10L 15/19* (2013.01)
*G10L 15/10* (2006.01)
*G10L 15/02* (2006.01)

(56) References Cited

U.S. PATENT DOCUMENTS

| | | | | |
|---|---|---|---|---|
| 5,857,099 | A * | 1/1999 | Mitchell et al. | 704/235 |
| 6,070,140 | A * | 5/2000 | Tran | 704/275 |
| 6,169,972 | B1 * | 1/2001 | Kono et al. | 704/257 |
| 6,223,158 | B1 * | 4/2001 | Goldberg | 704/252 |
| 6,249,763 | B1 * | 6/2001 | Minematsu | 704/252 |
| 6,314,399 | B1 * | 11/2001 | Deligne et al. | 704/257 |
| 6,721,697 | B1 * | 4/2004 | Duan et al. | 704/9 |
| 7,027,985 | B2 * | 4/2006 | Wutte | 704/235 |
| 7,143,035 | B2 * | 11/2006 | Dharanipragada et al. | 704/244 |
| 7,280,964 | B2 * | 10/2007 | Wilson et al. | 704/251 |
| 7,542,971 | B2 * | 6/2009 | Thione et al. | 1/1 |
| 7,624,011 | B2 * | 11/2009 | Fukada | 704/240 |
| 7,912,700 | B2 * | 3/2011 | Bower et al. | 704/9 |
| 7,983,912 | B2 * | 7/2011 | Hirakawa et al. | 704/251 |
| 8,005,673 | B2 * | 8/2011 | Nagashima | 704/235 |
| 8,036,893 | B2 * | 10/2011 | Reich | 704/257 |
| 8,145,482 | B2 * | 3/2012 | Daya et al. | 704/236 |
| 8,150,678 | B2 * | 4/2012 | Sagawa | 704/2 |
| 8,214,210 | B1 * | 7/2012 | Woods | 704/236 |
| 8,229,743 | B2 * | 7/2012 | Carter et al. | 704/251 |
| 8,396,878 | B2 * | 3/2013 | Acharya | 707/749 |
| 8,543,399 | B2 * | 9/2013 | Jeong et al. | 704/240 |
| 8,583,436 | B2 * | 11/2013 | Yamamoto et al. | 704/257 |
| 8,650,031 | B1 * | 2/2014 | Mamou et al. | 704/235 |
| 8,655,664 | B2 * | 2/2014 | Tachibana et al. | 704/270 |
| 8,712,774 | B2 * | 4/2014 | Wiggs | 704/253 |
| 8,744,839 | B2 * | 6/2014 | Sun et al. | 704/10 |
| 8,838,433 | B2 * | 9/2014 | Axelrod et al. | 704/2 |
| 2002/0046032 | A1 * | 4/2002 | Wutte | 704/270 |
| 2002/0087309 | A1 * | 7/2002 | Lee et al. | 704/240 |
| 2002/0099542 | A1 * | 7/2002 | Mitchell et al. | 704/231 |
| 2002/0116196 | A1 * | 8/2002 | Tran | 704/270 |
| 2002/0128833 | A1 * | 9/2002 | Steinbiss | 704/235 |
| 2002/0133341 | A1 * | 9/2002 | Gillick et al. | 704/235 |
| 2002/0188446 | A1 * | 12/2002 | Gao et al. | 704/240 |
| 2002/0194004 | A1 * | 12/2002 | Glinski et al. | 704/270.1 |
| 2003/0149561 | A1 * | 8/2003 | Zhou | 704/240 |
| 2003/0149562 | A1 * | 8/2003 | Walther | 704/243 |
| 2003/0187648 | A1 * | 10/2003 | Dharanipragada et al. | 704/260 |
| 2003/0204399 | A1 * | 10/2003 | Wolf et al. | 704/251 |
| 2003/0229497 | A1 * | 12/2003 | Wilson et al. | 704/270.1 |
| 2004/0111264 | A1 * | 6/2004 | Wang et al. | 704/257 |
| 2004/0236575 | A1 * | 11/2004 | Goronzy et al. | 704/231 |
| 2004/0243407 | A1 * | 12/2004 | Yu et al. | 704/240 |
| 2005/0131699 | A1 * | 6/2005 | Fukada | 704/270 |
| 2005/0137868 | A1 * | 6/2005 | Epstein et al. | 704/252 |
| 2005/0154690 | A1 * | 7/2005 | Nitta et al. | 706/46 |
| 2005/0182629 | A1 * | 8/2005 | Coorman et al. | 704/266 |
| 2005/0256712 | A1 * | 11/2005 | Yamada et al. | 704/255 |
| 2006/0020463 | A1 * | 1/2006 | Reich | 704/257 |
| 2006/0100876 | A1 * | 5/2006 | Nishizaki et al. | 704/257 |
| 2007/0073540 | A1 * | 3/2007 | Hirakawa et al. | 704/252 |
| 2007/0078653 | A1 * | 4/2007 | Olsen | 704/240 |
| 2007/0136058 | A1 * | 6/2007 | Jeong et al. | 704/240 |
| 2008/0046244 | A1 * | 2/2008 | Ohno et al. | 704/255 |
| 2008/0195388 | A1 * | 8/2008 | Bower et al. | 704/243 |
| 2009/0055185 | A1 * | 2/2009 | Nakade et al. | 704/257 |
| 2009/0070101 | A1 * | 3/2009 | Masuyama et al. | 704/9 |
| 2009/0132251 | A1 * | 5/2009 | Sagawa | 704/254 |
| 2009/0198488 | A1 * | 8/2009 | Vigen | 704/9 |
| 2009/0271195 | A1 * | 10/2009 | Kitade et al. | 704/239 |
| 2009/0292541 | A1 * | 11/2009 | Daya et al. | 704/251 |
| 2009/0326936 | A1 * | 12/2009 | Nagashima | 704/235 |
| 2010/0010813 | A1 * | 1/2010 | Harada | 704/249 |
| 2010/0042405 | A1 * | 2/2010 | Tsuzuki et al. | 704/10 |
| 2010/0250250 | A1 * | 9/2010 | Wiggs | 704/235 |
| 2010/0324901 | A1 * | 12/2010 | Carter et al. | 704/255 |
| 2011/0004462 | A1 * | 1/2011 | Houghton et al. | 704/9 |
| 2011/0173000 | A1 * | 7/2011 | Yamamoto et al. | 704/240 |
| 2011/0301943 | A1 * | 12/2011 | Patch | 704/9 |
| 2012/0065981 | A1 * | 3/2012 | Tachibana et al. | 704/270 |
| 2012/0078631 | A1 * | 3/2012 | Sun et al. | 704/254 |
| 2012/0203541 | A1 * | 8/2012 | Liu et al. | 704/8 |
| 2013/0339001 | A1 * | 12/2013 | Craswell et al. | 704/9 |
| 2014/0012582 | A1 * | 1/2014 | Ganong et al. | 704/257 |
| 2014/0195238 | A1 * | 7/2014 | Terao et al. | 704/251 |
| 2014/0297267 | A1 * | 10/2014 | Spencer et al. | 704/9 |

FOREIGN PATENT DOCUMENTS

| | | |
|---|---|---|
| JP | 2002-041081 | 2/2002 |
| JP | 2002-342323 | 11/2002 |
| JP | 2005-227686 A | 8/2005 |
| JP | 2008-181537 A | 8/2008 |

* cited by examiner

FIG.3

| WRITING | READING INFORMATION | POSITIONAL INFORMATION |
|---|---|---|
| 衆議院 | syuugiin | 0 |
| 衆議院で | syuugiinde | 1 |
| 衆議院で改正法 | syuugiindekaiseihou | 2 |
| で | de | 3 |
| で改正法 | dekaiseihou | 4 |
| で改正法が | dekaiseihouga | 5 |
| 改正法 | kaiseihou | 6 |
| 改正法が | kaiseihouga | 7 |
| 改正法が審議 | kaiseihougashingi | 8 |
| が | ga | 9 |
| が審議 | gashingi | 10 |
| が審議入り | gashingiiri | 11 |
| 審議 | shingi | 12 |
| 審議入り | shingiiri | 13 |
| (審議入り。 | shingiiri_ | 14) |
| 入り | iri | 15 |
| (入り。 | iri_ | 16) |
| (入り。山川 | iri_yamakawa | 17) |
| (。 | _ | 18) |
| (。山川 | _yamakawa | 19) |
| (。山川総理 | _yamakawasouri | 20) |
| 山川 | yamakawa | 21 |
| 山川総理 | yamakawasouri | 22 |
| 山川総理が | yamakawasouriga | 23 |
| 総理 | souri | 24 |
| 総理が | souriga | 25 |
| 総理が法案 | sourigahouan | 26 |
| が | ga | 27 |
| が法案 | gahouan | 28 |
| が法案を | gahouanwo | 29 |
| 法案 | houan | 30 |
| 法案を | houanwo | 31 |
| 法案を通 | houanwotoo | 32 |
| を | wo | 33 |
| を通 | wotoo | 34 |
| を通し | wotooshi | 35 |
| 通 | too | 36 |
| 通し | tooshi | 37 |
| 通したい | tooshitai | 38 |
| し | shi | 39 |
| したい | shitai | 40 |
| したいと | shitaito | 41 |
| たい | tai | 42 |
| たいと | taito | 43 |
| たいと言及 | taitogenkyuu | 44 |
| と | to | 45 |
| と言及 | togenkyuu | 46 |
| (と言及_ | togenkyuu_ | 47) |
| 言及 | genkyuu | 48 |
| (言及_ | genkyuu_ | 49) |
| (言及__ | genkyuu__ | 50) |

FIG.8

| WRITING | READING INFORMATION | POSITIONAL INFORMATION | PHRASE IDENTIFIER |
|---|---|---|---|
| 決勝 | kessyou | 0 | 10 |
| に | ni | 3 | 10 |
| 決勝に | kessyouni | 4 | 10 |
| 海山学院 | umiyamagakuin | 6 | 10 |
| に海山学院 | niumiyamagakuin | 7 | 10 |
| 決勝に海山学院 | kessyouniumiyamagakuin | 8 | 10 |
| が | ga | 9 | 10 |
| 海山学院が | umiyamagakuinga | 10 | 10 |
| に海山学院が | niumiyamagakuinga | 11 | 10 |
| 進出 | shinsyutsu | 12 | 10 |
| が進出 | gashinsyutsu | 13 | 10 |
| 海山学院が進出 | umiyamagakuingashinsyutsu | 14 | 10 |
| 山川 | yamakawa | 18 | 11 |
| 総理 | souri | 21 | 11 |
| 山川総理 | yamakawasouri | 22 | 11 |
| が | ga | 24 | 11 |
| 総理が | souriga | 25 | 11 |
| 山川総理が | yamakawasouriga | 26 | 11 |
| 法案 | houan | 27 | 11 |
| が法案 | gahouan | 28 | 11 |
| 総理が法案 | sourigahouan | 29 | 11 |
| を | wo | 30 | 11 |
| 法案を | houanwo | 31 | 11 |
| が法案を | gahouanwo | 32 | 11 |
| 通 | too | 33 | 11 |
| を通 | wotoo | 34 | 11 |
| 法案を通 | houanwotoo | 35 | 11 |
| し | shi | 36 | 11 |
| 通し | tooshi | 37 | 11 |
| を通し | wotooshi | 38 | 11 |
| たい | tai | 39 | 11 |
| したい | shitai | 40 | 11 |
| 通したい | tooshitai | 41 | 11 |
| と | to | 42 | 11 |
| たいと | taito | 43 | 11 |
| したいと | shitaito | 44 | 11 |
| 言及 | genkyuu | 45 | 11 |
| と言及 | togenkyuu | 46 | 11 |
| たいと言及 | taitogenkyuu | 47 | 11 |

| WRITING | READING INFORMATION |
|---|---|
| に関する (concerning about) | nikansuru |
| に関連する (related to) | nikanrensuru |
| についての (about) | nitsuiteno |
| ニュース (news) | nyûsu |
| 解説 (comment) | kaisetsu |
| ブログ (blog) | burogu |
| 話題 (topic) | wadai |
| を検索 (search for) | wokensaku |
| のニュース (news of) | nonyûsu |

FIG.17

| WORD CLASS OF HEADING WORD \ WORD CLASS OF ENDING WORD | NOUN | VERB | POSTPO-SITION |
|---|---|---|---|
| NOUN | 1 | 2 | 3 |
| VERB | 4 | 5 | 6 |
| POSTPOSITION | 7 | 8 | 9 |

FIG.18

| WRITING | READING INFORMATION | POSITIONAL INFORMATION | WORD CLASS NUMBER |
|---|---|---|---|
| 決勝 | kessyou | 0 | 1 |
| に | ni | 3 | 9 |
| 決勝に | kessyouni | 4 | 3 |
| 海山学院 | umiyamagakuin | 6 | 1 |
| に海山学院 | niumiyamagakuin | 7 | 7 |
| 決勝に海山学院 | kessyouniumiyamagakuin | 8 | 1 |
| が | ga | 9 | 9 |
| 海山学院が | umiyamagakuinga | 10 | 3 |
| に海山学院が | niumiyamagakuinga | 11 | 9 |
| 進出 | shinsyutsu | 12 | 1 |
| が進出 | gashinsyutsu | 13 | 7 |
| 海山学院が進出 | umiyamagakuingashinsyutsu | 14 | 1 |
| 山川 | yamakawa | 18 | 1 |
| 総理 | souri | 21 | 1 |
| 山川総理 | yamakawasouri | 22 | 1 |
| が | ga | 24 | 9 |
| 総理が | souriga | 25 | 3 |
| 山川総理が | yamakawasouriga | 26 | 3 |
| 法案 | houan | 27 | 1 |
| が法案 | gahouan | 28 | 7 |
| 総理が法案 | sourigahouan | 29 | 1 |
| を | wo | 30 | 9 |
| 法案を | houanwo | 31 | 3 |
| が法案を | gahouanwo | 32 | 9 |
| 通 | too | 33 | 5 |
| を通 | wotoo | 34 | 8 |
| 法案を通 | houanwotoo | 35 | 1 |
| し | shi | 36 | 5 |
| 通し | tooshi | 37 | 5 |
| を通し | wotooshi | 38 | 8 |
| たい | tai | 39 | 5 |
| したい | shitai | 40 | 5 |
| 通したい | tooshitai | 41 | 5 |
| と | to | 42 | 9 |
| たいと | taito | 43 | 5 |
| したいと | shitaito | 44 | 5 |
| 言及 | genkyuu | 45 | 1 |
| と言及 | togenkyuu | 46 | 4 |
| たいと言及 | taitogenkyuu | 47 | 4 |

FIG.20

|   | 1 | 2 | 3 | 4 | 5 | 6 | 7 | 8 | 9 |
|---|---|---|---|---|---|---|---|---|---|
| 1 | 100% | 100% | 100% | 50% | 50% | 50% | 100% | 100% | 100% |
| 2 | 100% | 100% | 100% | 100% | 100% | 100% | 0% | 0% | 0% |
| 3 | 100% | 100% | 100% | 100% | 100% | 100% | 0% | 0% | 0% |
| 4 | 100% | 100% | 100% | 50% | 50% | 50% | 100% | 100% | 100% |
| 5 | 100% | 100% | 100% | 100% | 100% | 100% | 0% | 0% | 0% |
| 6 | 100% | 100% | 100% | 100% | 100% | 100% | 0% | 0% | 0% |
| 7 | 100% | 100% | 100% | 50% | 50% | 50% | 100% | 100% | 100% |
| 8 | 100% | 100% | 100% | 100% | 100% | 100% | 0% | 0% | 0% |
| 9 | 100% | 100% | 100% | 100% | 100% | 100% | 0% | 0% | 0% |
| HEADING | 100% | 100% | 100% | 0% | 0% | 0% | 0% | 0% | 0% |
| ENDING | 100% | 100% | 0% | 100% | 100% | 0% | 100% | 100% | 0% |

RECOGNIZING DEVICE, COMPUTER-READABLE RECORDING MEDIUM, RECOGNIZING METHOD, GENERATING DEVICE, AND GENERATING METHOD

CROSS-REFERENCE TO RELATED APPLICATION

This application is based upon and claims the benefit of priority of the prior Japanese Patent Application No. 2011-225344, filed on Oct. 12, 2011, the entire contents of which are incorporated herein by reference.

FIELD

The embodiments discussed herein are directed to a recognizing device, a recognizing program, a recognizing method, a generating device, a generating program, and a generating method.

BACKGROUND

There is a device that recognizes input voice using a text included in a file or a web page. An example of the above device includes a device that calculates a similarity between a voice signal indicating input voice and a word included in a text or a character string in which words are connected and judges a word or a character string when the calculated similarity exceeds a threshold value as a word or a character string corresponding to the voice signal.

Further, another example of the device that recognizes the input voice using a text includes a device that generates all connection patterns of words included in a text and registers the generated connection patterns in a dictionary that may be used to recognize the voice to generate a dictionary. The device that generates a dictionary compares the connection pattern registered in the dictionary with the voice signal indicating input voice to recognize the voice. In addition, when the number of words included in the text is n, the device that generates a dictionary generates the connection patterns as many as the sum of one to n.

Furthermore, another example of the device that recognizes the input voice using a text includes a device that re-trains a language model by an N-gram. The device that re-trains a language model increases a probability of connected words in a text with respect to a word string in which words are connected, with respect to the language model trained from a corpus. In this case, the device that re-trains a language model generates patterns as many as N-th power of the number of words present in the text and increases the probability of words connected with respect to the language model using the generated patterns.

Patent Document 1 Japanese Laid-open Patent Publication No. 2002-41081

Patent Document 2 Japanese Laid-open Patent Publication No. 2002-342323

However, the device according to the related art does not precisely recognize the voice. According to a specific example, when a voice which is not registered in the dictionary as a connection pattern is input, the precision of the recognition result of the input voice of the above-mentioned device that generates a dictionary is low. This is because even though a pattern of combination of adjacent words included in the text is included in the connection patterns registered in the dictionary, a pattern of the combination of words which are included in the text, but are not adjacent to each other, is not included in the connection patterns registered in the dictionary.

Further, in the above-mentioned device that re-trains the language, since the patterns are generated as many as N-th power of the number of words present in the text, the amount of information of the patterns to be generated is large.

SUMMARY

According to an aspect of an embodiment, a recognizing device includes a memory and a processor coupled to the memory. The memory stores words included in text and positional information indicating a position of the words in the text. The processor executes a process including comparing an input voice signal with reading information of a character string that connects a plurality of words stored in the memory to calculate a similarity; calculating a connection score indicating a proximity between the plurality of connected words based on positional information of the words stored in the memory; and determining a character string corresponding to the voice signal based on the similarity and the connection score.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a dictionary;

FIG. 8 is a diagram illustrating an example of a dictionary;

FIG. 17 is a diagram illustrating an example of a word class number table;

FIG. 18 is a diagram illustrating an example of a dictionary;

FIG. 20 is a diagram illustrating an example of a probability table;

DESCRIPTION OF EMBODIMENTS

Preferred embodiments of the present invention will be explained with reference to accompanying drawings.

However, the embodiments do not limit the disclosed technology. Therefore, in embodiments, the processing may be appropriately combined without being contradicted.

[a] First Embodiment

Figure 1:
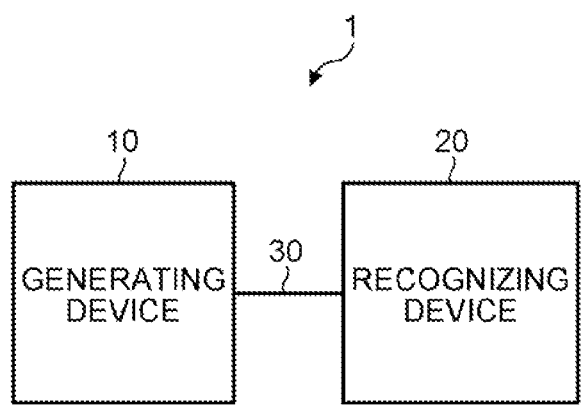
FIG. 1 is a diagram illustrating an example of a configuration of a system including a recognizing device and a generating device according to a first embodiment.

A recognizing device and a generating device according to a first embodiment will be described. FIG. 1 is a diagram illustrating an example of a configuration of a system including a recognizing device and a generating device according to the first embodiment. A system 1 according to the present embodiment includes a generating device 10 and a recognizing device 20. The generating device 10 and the recognizing device 20 are connected via a network 30. The generating device 10 may communicate with the recognizing device 20. In an example of FIG. 1, one generating device 10 and one recognizing device 20 are included in the system 1. However, the number of the generating device 10 and the number of the recognizing device 20 are not limited thereto. For example, a plurality of generating devices 10 and a plurality of recognizing devices 20 may be provided.

The generating device 10 generates a dictionary in which words included in a text are registered so as to be associated with positional information indicating a position of a word in the text. For example, first the generating device 10 splits a text indicated by input text file into words. The text is also referred to as a text. Therefore, the generating device 10 generates positional information indicating a position of the split word in the text. Continuously, the generating device 10 generates a dictionary in which the words are registered so as to be associated with the positional information indicating the position of the word in the text. The generating device 10 transmits the generated dictionary to the recognizing device 20.

The recognizing device 20 receives the dictionary transmitted from the generating device 10. The recognizing device 20 compares an input voice signal with reading information of a character string connecting a plurality of words which are registered in the dictionary to calculate a similarity. Continuously, the recognizing device 20 calculates a connection score indicating a proximity between a plurality of connected words based on the positional information of words registered in the dictionary. Therefore, the recognizing device 20 determines a character string corresponding to the input voice signal based on the similarity and the connection score. Further, the recognizing device 20 outputs the determined character string.

As described above, the recognizing device 20 calculates the connection score indicating a proximity between a plurality of words of the character string which is used to calculate the similarity. For example, the recognizing device 20 calculates the connection score so as to be higher as the plurality of words of the character string which is used to calculate the similarity is closer to each other. Therefore, the recognizing device 20 determines the character string corresponding to the input voice signal by adding not only the similarity but also the connection score. For example, the recognizing device 20 determines a character string corresponding to a value of values obtained by adding the similarity and the connection score which exceeds a threshold value as a character string corresponding to the input voice signal. Therefore, even when an utterer utters a character string with a plurality of connected words which are included in the text but not adjacent to each other in the text and the character string is input as a voice signal, the recognizing device 20 may recognize the voice uttered by the utterer. Accordingly, the recognizing device 20 allows precise recognition of voice.

Further, the generating device 10 may generate a dictionary that allows the precise recognition of voice as described above.

Example of Functional Configuration of Generating Device

Figure 2:
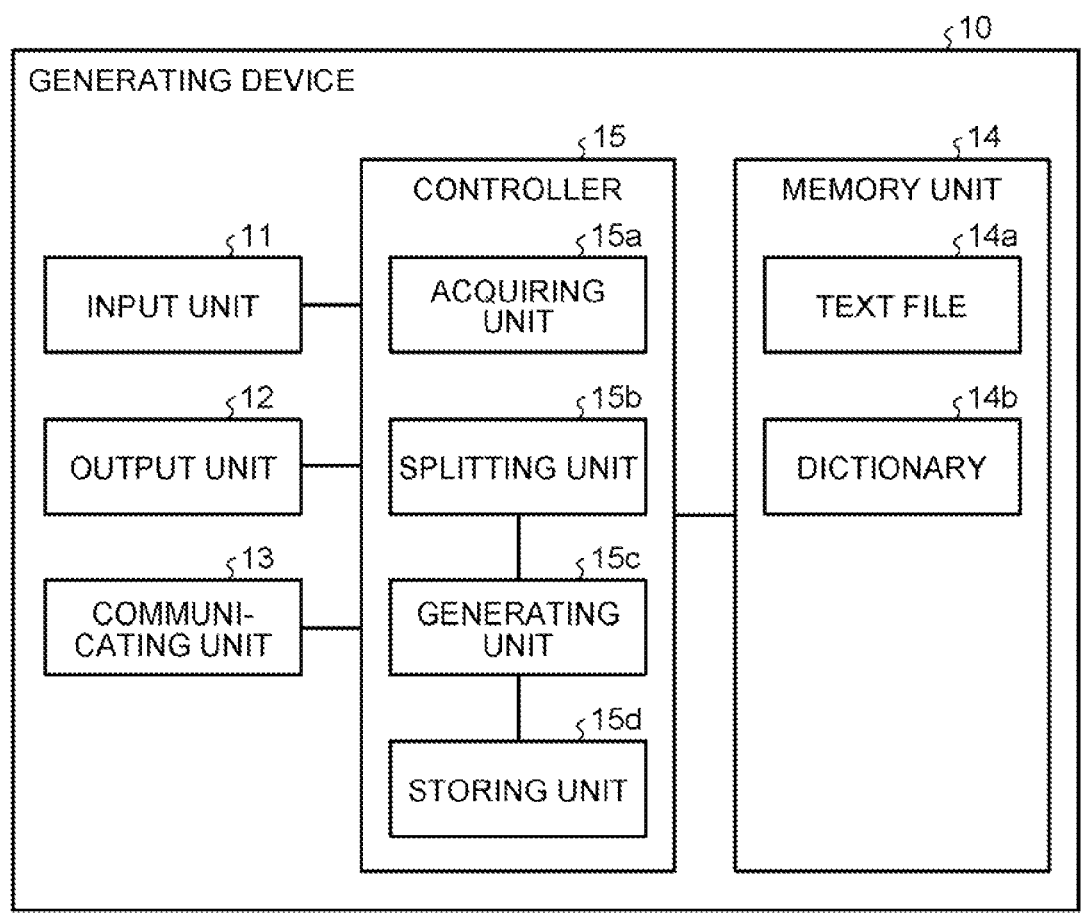
FIG. 2 is a diagram illustrating an example of a functional configuration of the generating device according to the first embodiment.

FIG. 2 is a diagram illustrating an example of a functional configuration of a generating device according to the first embodiment. In an example of FIG. 2, the generating device 10 includes an input unit 11, an output unit 12, a communicating unit 13, a memory unit 14, and a controller 15.

The input unit 11 inputs various information to the controller 15. For example, the input unit 11 receives an instruction of a user to obtain a text file including a text relating to a predetermined topic from another device and inputs the received instruction to the controller 15. An example of a device of the input unit 11 includes a mouse or a keyboard.

The output unit 12 outputs various information. For example, when an image is input from the controller 15, the output unit 12 displays the image. An example of a device of the output unit 12 includes a CRT (cathode ray tube) or a liquid crystal display.

The communicating unit 13 is a network interface for communicating with the recognizing device 20 and an external device. For example, when an instruction with respect to the external device that transmits a text file including a text relating to a predetermined topic to the generating device 10 is received from the controller 15, the communicating unit 13 transmits the received instruction to the external device via the network 30. Further, when a text file is received from the external device, the communicating unit 13 transmits the received text file to the controller 15.

The memory unit 14 stores a text file 14a and a dictionary 14b.

The text file 14a is stored in the memory unit 14 by an acquiring unit 15a which will be described below. The text file indicates a text. The text file 14a is used to generate the dictionary 14b which will be described below and is used when recognizing the voice uttered by the utterer. Therefore, the text file 14a that matches with contents uttered by the utterer may be stored in the memory unit 14. For example, when the utterer utters contents concerning weather, the contents of the text included in the text file may be contents concerning the weather.

The dictionary 14b is generated by a generating unit 15c which will be described below and stored in the memory unit 14 by a storing unit 15d which will be described below.

FIG. 3 is a diagram illustrating an example of a dictionary. In an example of FIG. 3, the dictionary 14b includes a "writing" section, a "reading information" section and a "positional information" section. In the "writing" section, words included in a text indicated by the input text file and word strings in which a plurality of words are coupled are registered. Further, in the "reading information" section, reading of the words or word strings registered in the "writing" section, that is, hiragana writing of the words or the word strings is registered. In the "positional information" section, the positional information indicating a position of the word or word strings registered in the "writing" section in the text is registered. The contents of the sections are generated by the generating unit 15c.

The example of FIG. 3 illustrates that in the first record, words "Japan's House of Representatives" included in texts indicated by the text file 14a "An amended law is deliberated in Japan's House of Representatives. The Prime Minister, Yamakawa mentioned that he would want to pass the bill." are registered in the "writing" section. Further, the example of FIG. 3 illustrates that in the first record, "syuugiin" which is the reading method of the "Japan's House of Representatives" is registered in the "reading information" section. In addition, the example of FIG. 3 illustrates that in the first record, the positional information "0" indicating the position of the words "Japan's House of Representatives" in the texts is registered in the "positional information" section.

Further, the example of FIG. 3 illustrates that in the second record, a word string "in Japan's House of Representatives" in which words "Japan's House of Representatives" and a word "in" which are included in the texts "An amended law is deliberated in Japan's House of Representatives. The Prime Minister, Yamakawa mentioned that he would want to pass the bill." are combined together is registered in the "writing" section. Further, the example of FIG. 3 illustrates that in the second record, "syuugiinde" which is the reading method of "in the Japan's House of Representatives" is registered in the "reading information" section. Furthermore, the example of FIG. 3 illustrates that in the second record, the positional information "1" indicating the position of in the text the word string "in Japan's House of Representatives" is registered in the "positional information" section.

The memory unit 14, for example, is a semiconductor memory device such as flash memory or a memory device such as a hard disc or an optical disc. Further, the memory unit 14 is not limited to the above-mentioned memory device, but may be RAM (random access memory) or ROM (read only memory).

The controller 15 includes internal memory for storing a program or control data that defines various procedures to execute various processing. The controller 15 includes an acquiring unit 15a, a splitting unit 15b, a generating unit 15c, and a storing unit 15d.

When an instruction that acquires a text file 14a including a text relating to a predetermined topic from another device is received from the input unit 11, the acquiring unit 15a transmits the instruction with respect to the external device, which is not illustrated, that transmits the text file 14a to the generating device 10, to the communicating unit 13. By doing this, the text file 14a including a text relating to a predetermined topic is transmitted from the external device to the generating device 10. Therefore, the acquiring unit 15a may acquire the text file 14a including a text relating to a predetermined topic from the external device. The acquiring unit 15a stores the acquired text file 14a in the memory unit 14.

The splitting unit 15b splits the text indicated by the text file 14a into words. For example, the splitting unit 15b uses software for analyzing a morpheme such as "ChaSen" or "MeCab" to perform morphological analysis for the text indicated by the text file 14a and split the text into morphemes. The splitting unit 15b considers the split morphemes as words to split the text into words. Hereinafter, an example that considers the morphemes as words will be described. However, a plurality of morphemes, for example, three morphemes including a stem, a conjugational ending, and an auxiliary verb may be considered as one word. For example, if the three morphemes are a stem "通", a conjugational ending "し", and an auxiliary verb "たい", "通したい" may be considered as one word. Further, the splitting unit 15b may use the above-mentioned software "ChaSen" or "MeCab" to obtain reading information for every word. In other words, the splitting unit 15b splits the text into words and acquires the reading information of the words. When the total number of words obtained by the splitting unit 15b is M, a heading word of the text becomes the first word and a last word of the text becomes an M-th word.

For example, if the texts indicated by the text file 14a are "An amended law is deliberated in Japan's House of Representatives. The Prime Minister, Yamakawa mentioned that he would want to pass the bill.", the splitting unit 15b splits the first text "An amended law is deliberated in Japan's House of Representatives." into words as follows and acquires the reading information of the words. In other words, the splitting unit 15b splits the text into words as follows: "Japan's House of Representatives+syuugiin/in+de/an amended law+kaiseihou/is+ga/deliberated+shingiiri" and acquires the reading information of the words and acquires the reading information of the words. Here, "/" is a symbol that indicates a compartmental location of the words and "+" is a symbol that connects the words with the reading information corresponding to the word. Further, the splitting unit 15b also splits the text "The Prime Minister, Yamakawa mentioned that he would want to pass the bill." into words as follows and acquires the reading information of the words. That is, the splitting unit 15b splits the texts into words as follows: "山川+yamakawa/ 総理+souri/ が+ga/ 法案+houan/ を+wo/ 通+too/ し+shi/ たい+tai" and acquires the reading information of the words.

The generating unit 15c generates positional information indicating the position of in the text the words split by the splitting unit 15b. Additionally, the generating unit 15c generates word strings of one to (N−1) words which are continuous to each of the words. The generating unit 15c generates positional information indicating a position of the word string in the text.

A specific example will be described. For example, the generating unit 15c initializes values of the positional information n, a variable i, and a variable j. In other words, the generating unit 15c sets a value of the positional information n to 0, and the values of the variables i and j to 1 and 0, respectively. The generating unit 15c generates a word string from an i-th word to an (i+j)-th word. If j=0, the i-th word is considered as a word string and the following processing is performed. Further, if an (i+k; k≤j)-th word does not exist, the generating unit 15c treats the (i+k)-th word as a blank and generates a word string from the i-th word to the (i+j)-th word.

Further, if the newly generated word string, the reading information, and a value of the positional information n are registered in the dictionary 14b by the storing unit 15d, the generating unit 15c increases the value of the variable j by one and increases the value of the positional information n by one. The generating unit 15c judges whether the value of the variable j is smaller than a maximum coupling number N which is the maximum value of the number of the words coupled in the word string. If the value of the variable j is smaller than the maximum coupling number N, the generating unit 15c generates a word string from the i-th word to the (i+j)-th word again and performs processing same as the above-mentioned processing.

In contrast, if the value of the variable j is larger than the maximum coupling number N, the generating unit 15c increases the value of the variable i by one and sets the value of the variable j to 0. Continuously, the generating unit 15c judges whether the value of the variable i is smaller than a total word count M which is the total number of the words obtained by the splitting unit 15b. If value of the variable i is smaller than the total word count M, the generating unit 15c generates a word string from the i-th word to the (i+j)-th word again and performs processing same as the above-mentioned processing.

The storing unit 15d stores the words and word string, the corresponding reading information, and the corresponding positional information n in the memory unit 14 so as to be associated with each other. A specific example will be described. For example, when the generating unit 15c generates the word string from the i-th word to the (i+j)-th word, the storing unit 15d performs the following processing. That is, the storing unit 15d registers the newly generated word string, reading information corresponding to the newly generated word string, and a value of positional information n in the sections of the "writing", "reading information", and "positional information" of the dictionary 14b. If a punctuation mark "." or a space is included in the words of the newly generated word string, the storing unit 15d may omit the processing of registering the word string, the reading information, and the value of the positional information n in the dictionary 14b. This is because when the punctuation mark "." or the space is included in the words of the word string, the word string is not appropriate as a comparison target with a voice when the voice is recognized. Therefore, in the storing unit 15d, the speed of generating the dictionary 14b becomes faster. Further, the storing unit 15d may generate a dictionary 14b having a reduced amount of information.

As described above, the dictionary 14b is generated by the generating unit 15c and the storing unit 15d. For example, when the texts indicated by the text file 14a are "An amended law is deliberated in Japan's House of Representatives. The Prime Minister, Yamakawa mentioned that he would want to pass the bill.", the dictionary 14b as illustrated in an example of FIG. 3 is generated. In the example of FIG. 3, the value of the maximum coupling number N is 3. Further, the example of FIG. 3 illustrates that the word string including words indicating the punctuation mark or the space is also registered in the dictionary 14b, which is for convenience of description. In the example of FIG. 3, with respect to the record corresponding to the word string including words indicating the punctuation mark or the space, a symbol "(" is attached to a heading part of the word string registered in the "writing" section. However, the record corresponding to the word string to which the symbol "(" is attached is not registered in the dictionary 14b. In other words, the storing unit 15d registers the records as many as the total word count M×the maximum coupling number N−Σn (n=1, 2, . . . , N−1) in the dictionary 14b. Therefore, it is possible to generate the dictionary 14b having a reduced amount of information.

Further, the value of the maximum coupling number N preferably is in accordance with a reading length which allows better precision for recognition by the recognizing device 20 that recognizes a voice. For example, when the reading length which allows the better recognition precision is eight syllables and an average syllable length of words is three, 8/3=2.6 . . . . Therefore, the value of the maximum coupling number N is preferably 2 or 3. In the following description, an example when the value of the maximum coupling number N is 3 will be described. However, the value of the maximum coupling number N is not limited thereto.

In addition, if the transmission request of the dictionary 14b is received from the recognizing device 20, the storing unit 15d reads the dictionary 14b from the memory unit 14 and transmits the dictionary 14b to the communicating unit 13. The communicating unit 13 that has received the dictionary 14b transmits the dictionary 14b to the recognizing device 20 through the network 30.

The controller 15 is an integrated circuit such as an ASIC (application specific integrated circuit) or an FPGA (field programmable gate array) or an electronic circuit such as a CPU (central processing unit) or an MPU (micro processing unit).

Example of Functional Configuration of Recognizing Device

Figure 4:
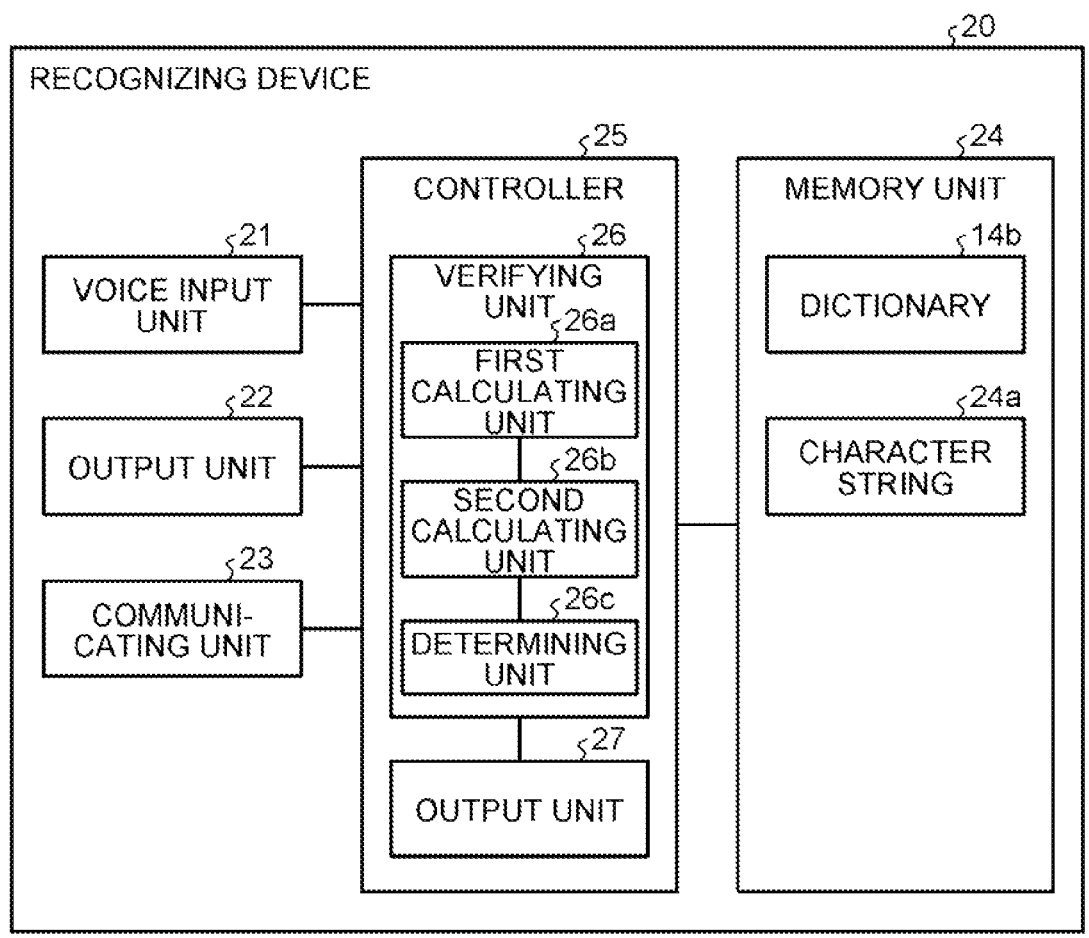
FIG. 4 is a diagram illustrating an example of a functional configuration of the recognizing device according to the first embodiment.

FIG. 4 is a diagram illustrating an example of a functional configuration of the recognizing device according to the first embodiment. In an example of FIG. 4, the recognizing device 20 includes a voice input unit 21, an output unit 22, a communicating unit 23, a memory unit 24, and a controller 25.

The voice input unit 21 A/D-converts a voice uttered by an utterer such as a user and inputs the voice to the controller 25 as a voice signal. An example of a device of the voice input unit 21 includes a microphone.

The output unit 22 outputs various information. For example, when an image indicating a character string as a voice recognition result is input from the controller 25, the output unit 22 displays the image. An example of a device of the output unit 22 includes a CRT (cathode ray tube) or a liquid crystal display.

The communicating unit 23 is a network interface for communicating with the generating device 10. For example, when a transmission request with respect to the generating device 10 that transmits the dictionary 14b to the recognizing device 20 is received from the controller 25, the communicating unit 23 transmits the transmission request to the generating device 10 via the network 30. Further, when the dictionary 14b is received from the generating device 10, the communicating unit 23 transmits the received dictionary 14b to the controller 25.

The memory unit 24 stores the dictionary 14b and a character string 24a.

The dictionary 14b is acquired from the generating device 10 and stored in the memory unit 24 by a first calculating unit 26a which will be described below. Further, the character string 24a is determined as a character string corresponding to the input voice signal by a determining unit 26c, which will be described below, as a result of voice recognition and stored in the memory unit 24 by an output unit 27 which will be described below.

Further, the memory unit 24 stores an acoustic model such as a hidden Markov model, which corresponds to the reading information registered in the "reading information" section of the dictionary 14b. When the voice is recognized to calculate the similarity (probability value), the acoustic model is compared with the voice signal.

The memory unit 24, for example, is a semiconductor memory device such as flash memory or a memory device such as a hard disc or an optical disc. Further, the memory unit 24 is not limited to the above-mentioned memory device, but may be RAM (random access memory) or ROM (read only memory).

The controller 25 includes internal memory for storing a program or control data that defines various procedures to execute various processing. The controller 25 includes a verifying unit 26 and an output unit 27.

The verifying unit 26 compares the input voice signal with a plurality of combinations of the acoustic models corresponding to a plurality of combinations of reading information registered in the dictionary 14b and calculates a similarity for every combination of the acoustic model. The "combination of reading information" indicates the reading information if the number of reading information is one. If the number of reading information is plural, the "combination of reading information" indicates a character string when the reading information is arranged in an order to connect the individual reading information. The combinations of reading information may be varied by changing the arrangement order. The "combinations of acoustic models" is the same as the above. Further, the verifying unit 26 performs the following processing based on the positional information of the word or the character string corresponding to the reading information combined when the similarity is calculated. That is, the verifying unit 26 calculates, with respect to the words or the character strings corresponding to the plurality of combined reading information, the connection score indicating a proximity of the position in the text between words, between character strings, or between a word and a character string for every combination of the reading information. The verifying unit 26 determines a character string corresponding to a sum that exceeds a threshold value and has the largest value among a plurality of calculated sums as a character string corresponding to the voice signal. Therefore, even when a character string connecting a plurality of words that are included in the text but are not adjacent to each other in the text is uttered by the utterer to be input as a voice signal, according to the verifying unit 26, the voice uttered by the utterer may be recognized.

Therefore, according to the verifying unit 26, the voice may be precisely recognized.

The verifying unit 26 includes the first calculating unit 26a, a second calculating unit 26b, and the determining unit 26c.

The first calculating unit 26a compares the input voice signal with the acoustic models corresponding to the reading information of the character string connecting a plurality of words and word strings registered in the dictionary 14b to calculate a similarity.

A specific example will be described. For example, when an instruction that performs the recognition processing is received from a user through a manipulation receiving device (not illustrated) such as a keyboard or a mouse provided in the recognizing device 20, the first calculating unit 26a performs the following processing. That is, the first calculating unit 26a transmits a transmission request with respect to the generating device 10 that transmits the dictionary 14b to the recognizing device 20 to the communicating unit 23. Continuously, the first calculating unit 26a judges whether the dictionary 14b from the generating device 10. When the dictionary 14b is received, the first calculating unit 26a stores the received dictionary 14b in the memory unit 24.

Thereafter, the first calculating unit 26a judges whether the voice signal is received through the voice input unit 21. When the voice signal is received, the first calculating unit 26a splits the voice signal into frames. The first calculating unit 26a judges whether the processing described below are performed on all frames. If there is an unprocessed frame, the first calculating unit 26a generates a plurality of combinations of reading information registered in the dictionary 14b with respect to the unprocessed frame and generates the combination of the acoustic models corresponding to the plurality of generated combinations.

Further, the first calculating unit 26a compares the frames with the plurality of combinations of the acoustic models and calculates a similarity for every combination of the acoustic models.

The second calculating unit 26b refers to the dictionary 14b and performs the following processing based on the positional information of the words or the character strings corresponding to the reading information combined when the similarity is calculated. In other words, the second calculating unit 26b calculates, with respect to the words or the character strings corresponding to the plurality of combined reading information, the connection score indicating a proximity of the position in the text between words, between character strings, or between a word and a character string for every combination of the reading information.

An example of a method of calculating a connection score performed by the second calculating unit 26b will be described. Here, it is assumed that the dictionary 14b illustrated in the example of FIG. 3 is stored in the memory unit 24. When the first calculating unit 26a calculates the similarity, the second calculating unit 26b specifies all combinations of acoustic models that are used to be compared with the voices signal. The second calculating unit 26b refers to the dictionary 14b and specifies the combinations of the corresponding reading information for every specified acoustic model. Continuously, the second calculating unit 26b refers to the dictionary 14b and acquires the positional information corresponding to the combined reading information for every combination of all specified reading information.

Thereafter, the second calculating unit 26b judges whether values indicated by the positional information corresponding to the combined reading information are in an ascending order from the heading. For example, if the combined reading information is "syuugiin", "de", and "kaiseihou", the positional information registered in the dictionary 14b illustrated in the example of FIG. 3 is "0", "3", and "6", respectively. Therefore, the second calculating unit 26b judges that the values are in the ascending order. Further, if the combined reading information is "syuugiinde", "de", and "kaiseihou", the positional information registered in the dictionary 14b illustrated in the example of FIG. 3 is "1", "3", and "6", respectively. Therefore, the second calculating unit 26b judges that the values are in the ascending order. If the combined reading information is "syuugiin", "kaiseihou", and "de", the positional information registered in the dictionary 14b illustrated in the example of FIG. 3 is "0", "6", and "3". Therefore, the second calculating unit 26b judges that the values are not in the ascending order. If the combined reading information is "syuugiin", "kaiseihou", and "shingiiri", the positional information registered in the dictionary 14b illustrated in the example of FIG. 3 is "0", "6", and "13". Therefore, the second calculating unit 26b judges that the values are in the ascending order.

Continuously, the second calculating unit 26b performs the following processing on the combination in which the values indicated by the positional information are judged to be in the ascending order. Specifically, among the combined reading information, the value indicated by the positional information corresponding to reading information which is closer to the heading between two coupled reading information, that is, adjacent reading information is substituted into the variable x, and the value indicated by the positional information corresponding to the reading information which is farther from the heading is substituted into the variable y. Therefore, the second calculating unit 26b calculates X and Y based on the following Equations (1) and (2).

$$X=(x/N)+(x\%N)+1 \quad (1)$$

$$Y=(y/N) \quad (2)$$

Here, N is the above-mentioned maximum coupling number. Further, "/" refers to a division operation for obtaining an integer remainder obtain by rounding off to a whole number. "%" refers to a residue arithmetic.

For example, if the combined reading information is "syuugiin", "de", and "kaiseihou", the positional information is "0", "3", and "6", respectively. Therefore, with respect to adjacent reading information of "syuugiin" and "de", X and Y are calculated by substituting "0" and "3" into the variables x and y, respectively. Further, with respect to adjacent reading information of "de" and "kaiseihou", X and Y are calculated by substituting "3" and "6" into the variables x and y, respectively. Further, if the combined reading information is "syuugiinde", "de", and "kaiseihou", the positional information is "1", "3", and "6", respectively. Therefore, with respect to adjacent reading information of "syuugiinde" and "de", X and Y are calculated by substituting "1" and "3" into the variables x and y, respectively. Further, with respect to adjacent reading information of "de" and "kaiseihou", X and Y are calculated by substituting "3" and "6" into the variables x and y, respectively.

The second calculating unit 26b performs the processing of calculating X and Y as described above on all adjacent reading information included in the combination in which the values indicated by the positional information are judged to be in the ascending order.

Continuously, if X>Y, it is considered that the same reading information (words or character string corresponding to the reading information) are repeatedly used for adjacent reading information and thus the combination of the above adjacent reading information is not appropriate. Therefore, the second calculating unit 26b assigns a lowest point to the connection score. For example, when the connection score is 0 to 30 points, the second calculating unit 26b assigns 0 point. When "syuugiinde" and "de" whose positional information is "1" and "3" are combined as adjacent reading information, X=2 and Y=1 and the word "de" corresponding to the reading information of "in" overlaps. Therefore, the second calculating unit 26b assigns 0 point to the connection score.

Further, if X=Y, it is considered that since the words or the character strings are adjacent in the text indicated by the input text file 14a, it is considered that the combination of the reading information is appropriate. Therefore, the second calculating unit 26b assigns a highest point to the connection score. For example, if the connection score is 0 to 30 points, the second calculating unit 26b assigns 30 points. If "shuugiin" and "de" whose positional information is "0" and "3" are combined as adjacent reading information, X=Y=1 and the second calculating unit 26b assigns 30 points to the connection score. In addition, if "de" and "kaiseihou" whose positional information is "3" and "6" are combined as adjacent reading information, X=Y=2 and the second calculating unit 26b assigns 30 points to the connection score.

Further, if X<Y, it is considered that as the value of Y-X becomes smaller, the words or the character strings corresponding two adjacent reading information are located to be closer in the text indicated by the text file 14a. Therefore, the second calculating unit 26b assigns a point to the connection score so that the smaller the value of Y-X, the larger the connection score. For example, if the connection score is 0 to 30 points, the second calculating unit 26b uses MAX (0, 30-(Y-X)). Here, MAX (A, B) is a function that selects a larger value between A and B.

The second calculating unit 26b calculates the connection scores for all adjacent reading information where X and Y are calculated as described above.

In addition, even though it is described as an example that the second calculating unit 26b calculates the connection score only for the combination when the positional information is in the ascending order, the above-described device is not limited thereto. For example, if the positional information is in the descending order, the second calculating unit 26b may perform the following processing. Specifically, with respect to the adjacent reading information among the combined reading information, the value indicated by the positional information corresponding to reading information which is closer to the heading may be substituted into the variable y, and the value indicated by the positional information corresponding to the reading information which is farther from the heading may be substituted into the variable x. In this case, a predetermined point, for example, 3 points are deducted from the calculated X and Y so that the connection score of the ascending order is different from that of the descending order. Therefore, the connection score is calculated not only in the ascending order but also in the descending order so that when the words or the character strings corresponding to the reading information combined when the similarity is calculated are close to each other in the text indicated by the text file 14a, a high point of connection score may be calculated. For example, when the text indicated by the text file 14a is "An amended law is deliberated in Japan's House of Representatives. The Prime Minister, Yamakawa mentioned that he would want to pass the bill.", the connection score is also calculated in accordance with the proximity between words with respect to the combination of the words or the character strings whose word order is different from the text indicated by the text file 14a saying "an amended law that the Prime Minister, Yamakawa wants to pass". Therefore, even when the utterer utters that "an amended law that the Prime Minister, Yamakawa wants to pass", it is possible to recognize the voice.

The determining unit 26c determines the character string corresponding to the input voice signal based on the similarity and the connection score. For example, the determining unit 26c calculates the sum of the corresponding similarity and the corresponding connection score for every combination of the acoustic models used when the similarity is calculated, that is, every combination of the reading information corresponding to the combination of the acoustic models. The determining unit 26c judges whether there is a sum among the plurality of calculated sums that exceeds a threshold value. If there is a sum that exceeds a threshold value, the character string corresponding to the largest sum among the sums that exceed a threshold value is determined as the character string corresponding to the voice signal. By doing this, the determining unit 26c determines the character string for each of the frames.

The output unit 27 transmits the character string determined for each of the frames to the output unit 22 so as to display the character string on a screen as the recognition result of the voice. Further, the output unit 27 stores the character string determined for each of the frames in the memory unit 24. The character strings stored in the memory unit 24 are character strings denoted by reference numeral 24a.

The controller 25 is an integrated circuit such as an ASIC (application specific integrated circuit) or an FPGA (field programmable gate array) or an electronic circuit such as a CPU (central processing unit) or an MPU (micro processing unit).

Flow of Processing

Figure 5:
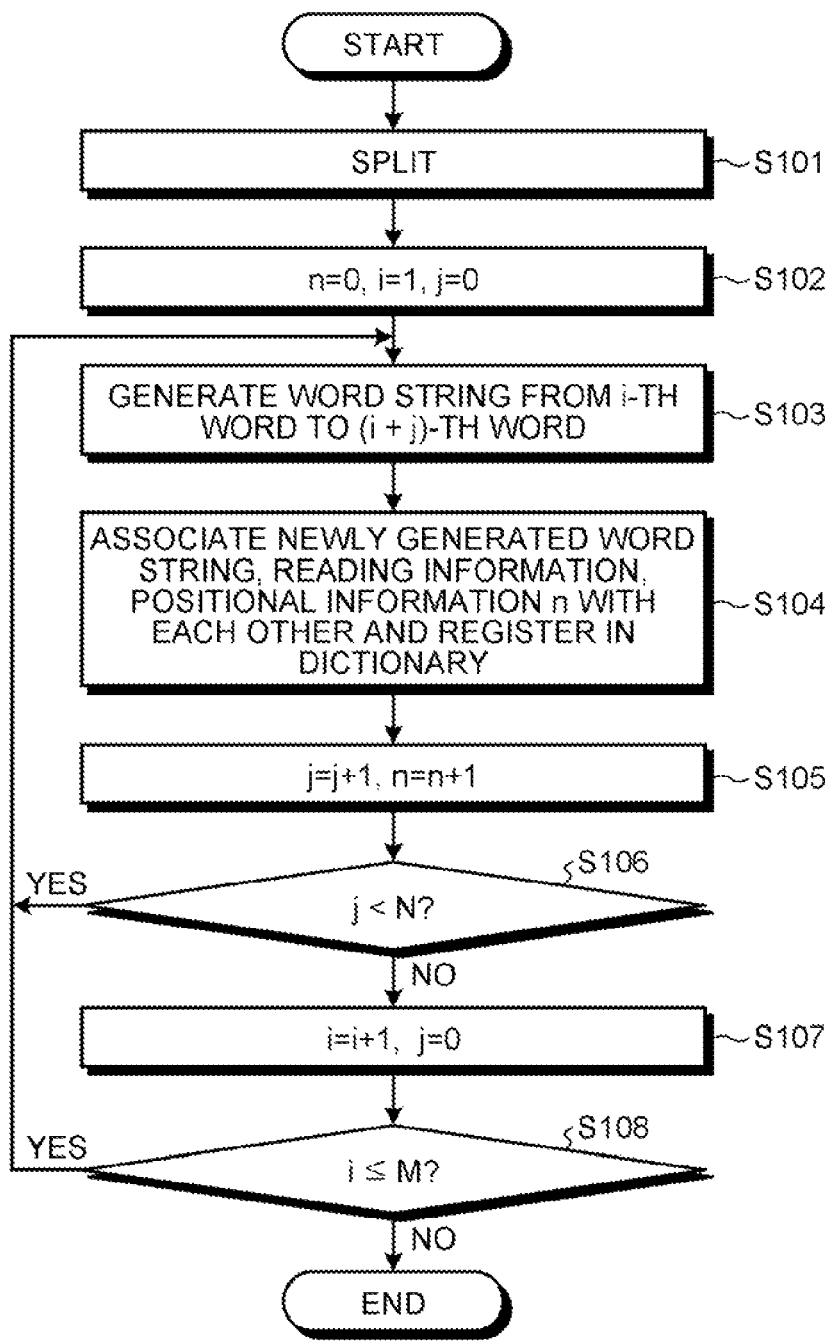
FIG. 5 is a flowchart illustrating a sequence of a generation processing according to the first embodiment.

Next, the flow of the processing of the generating device 10 according to the embodiment will be described. FIG. 5 is a flowchart illustrating a sequence of a generation processing according to the first embodiment. The generation processing is performed when an instruction that performs the generation processing is input from the input unit 11 to the controller 15.

As illustrated in FIG. 5, the splitting unit 15b splits the text indicated by the text file 14a into words (S101). The generating unit 15c sets a value of the positional information n to 0, and the values of the variables i and j to 1 and 0, respectively (S102). The generating unit 15c generates a word string from an i-th word to an (i+j)-th word (S103).

The storing unit 15d registers the newly generated word string, reading information corresponding to the newly generated word string, and a value of positional information n in the sections of the "writing", "reading information", and "positional information" of the dictionary 14b, respectively (S104). The generating unit 15c increases the value of the variable j by one and increases the value of the positional information n by one (S105). The generating unit 15c judges whether the value of the variable j is smaller than a maximum coupling number N which is the maximum value of the number of the words coupled in the word string (S106). If the variable j is smaller than the maximum coupling number N (Yes in S106), the procedure returns to step S103.

In contrast, if the value of the variable j is larger than the maximum coupling number N (No in S106), the generating unit 15c increases the value of the variable i by one and sets the value of the variable j to 0 (S107). The generating unit 15c judges whether the value of the variable i is smaller than a total word count M which is the total number of the words obtained by the splitting unit 15b (S108). If the value of the variable i is smaller than the total word count M (Yes in S108), the procedure returns to step S103. In contrast, if the value of the variable i is larger than the total word count M (No in S108), the processing is completed.

Figure 6:
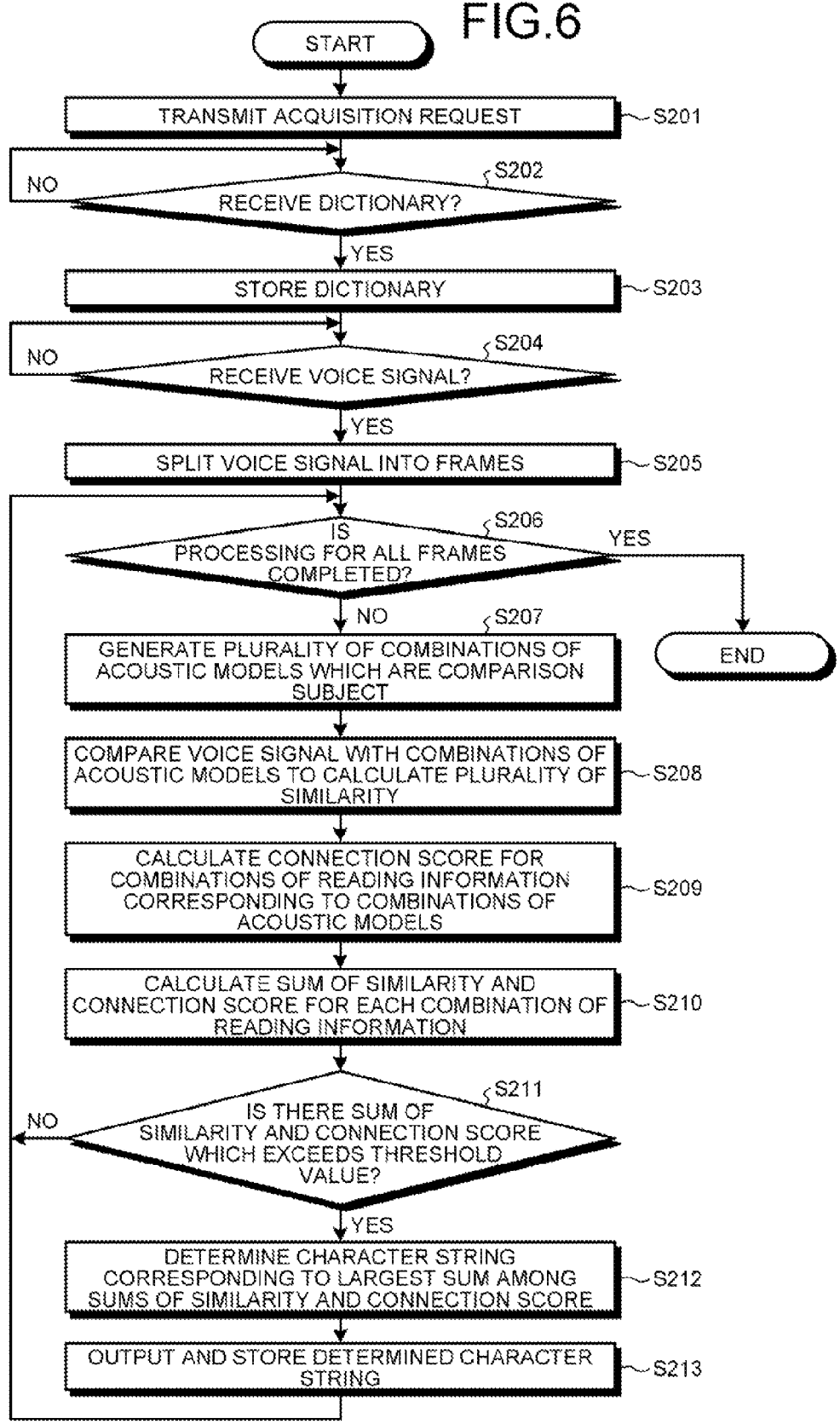
FIG. 6 is a flowchart illustrating a sequence of a recognition processing according to the first embodiment.

Next, the flow of processing of the recognizing device 20 according to the embodiment will be described. FIG. 6 is a flowchart illustrating a sequence of a recognition processing according to the first embodiment. The recognition processing is performed when an instruction that performs the recognition processing is received from the manipulation receiving unit (not illustrated) to the controller 25.

As illustrated in FIG. 6, the first calculating unit 26a transmits a transmission request with respect to the generating device 10 that transmits the dictionary 14b to the recognizing device 20 to the communicating unit 23 (S201). Continuously, the first calculating unit 26a judges whether the dictionary 14b is received from the generating device 10 (S202). When the dictionary 14b is not received (No in S202), the first calculating unit 26a performs the above judgment again. When the dictionary 14b is received (Yes in S202), the first calculating unit 26a stores the received dictionary 14b in the memory unit 24 (S203).

The first calculating unit 26a judges whether the voice signal is received through the voice input unit 21 (S204). When the voice signal is not received (No in S204), the first calculating unit 26a performs the above judgment again. In the meantime, when the voice signal is received (Yes in S204), the first calculating unit 26a splits the voice signal into frames (S205). The first calculating unit 26a judges whether the following processing S207 or later are performed on all frames (S206). If there is no unprocessed frame (Yes in S206), the processing is completed. If there is an unprocessed frame (No in S206), the first calculating unit 26a performs the following processing. That is, the first calculating unit 26a generates a plurality of combinations of reading information registered in the dictionary 14b with respect to the unprocessed frame and generates the combination of the acoustic models corresponding to the plurality of generated combinations (S207).

The first calculating unit 26a compares the frames with the plurality of combinations of the acoustic models and calculates a similarity for every combination of the acoustic models (S208).

The second calculating unit 26b refers to the dictionary 14b and performs the following processing based on the positional information of the words or the character strings corresponding to the reading information combined when the similarity is calculated. In other words, the second calculating unit 26b calculates, with respect to the words or the character strings corresponding to the plurality of combined reading information, the connection score indicating a proximity of the position in the text between words, between character strings, or between a word and a character string for every combination of the reading information (S209).

The determining unit 26c calculates the sum of the corresponding similarity and the corresponding connection score for every combination of the acoustic models used when the similarity is calculated, that is, every combination of the reading information corresponding to the combination of the acoustic models (S210). The determining unit 26c judges whether there is a sum among the plurality of calculated sums that exceeds a threshold value (S211). If there is no sum that exceeds a threshold value (No in S211), the procedure returns to step S206. If there is a sum that exceeds a threshold value (Yes in S211), the determining unit 26c determines the character string corresponding to the largest sum among the sums that exceed a threshold value as the character string corresponding to the voice signal (S212).

The output unit 27 transmits the character string determined for each of the frames to the output unit 22 so as to display the character string on a screen as the recognition result of the voice and stores the character string determined for each of the frames in the memory unit (S213), and the processing is completed.

Effect of First Embodiment

As described above, the recognizing device 20 compares the input voice signal with the plurality of combinations of acoustic models corresponding to the plurality of combinations of the reading information registered in the dictionary 14b and calculates a similarity for every combination of the acoustic models. Further, the recognizing device 20 performs the following processing based on the positional information of the word or the character string corresponding to the reading information combined when the similarity is calculated. That is, the recognizing device 20 calculates, with respect to the words or the character strings corresponding to the plurality of combined reading information, the connection score indicating a proximity of the position in the text between words, between character strings, or between a word and a character string for every combination of the reading information. The recognizing device 20 determines the character string corresponding to the largest sum that exceeds a threshold value among the plurality of calculated sums as the character string corresponding to the voice signal. According to the recognizing device 20, even when an utterer utters a character string connecting a plurality of words which is included in a text but are not adjacent to each other in the text and the character string is input as a voice signal, it is possible to recognize the voice uttered by the utterer. Therefore, according to the recognizing device 20, it is possible to precisely recognize the voice.

Further, the generating device 10 may generate the dictionary 14b so as to allow the recognizing device 20 to precisely recognize the voice.

In addition, since the generating device 10 registers the records as many as the total word count M x the maximum coupling number N−Σn (n=1, 2, . . . , N−1) in the dictionary 14b, it is possible to generate the dictionary 14b having a reduced amount of information.

[b] Second Embodiment

In a second embodiment, it is described that a dictionary 44b in which an identifier is registered for every phrase of a text included in a text file 14a is generated and a connection score is calculated for every phrase using the dictionary 44b.

Functional Configuration of Generating Device 40

Figure 7:
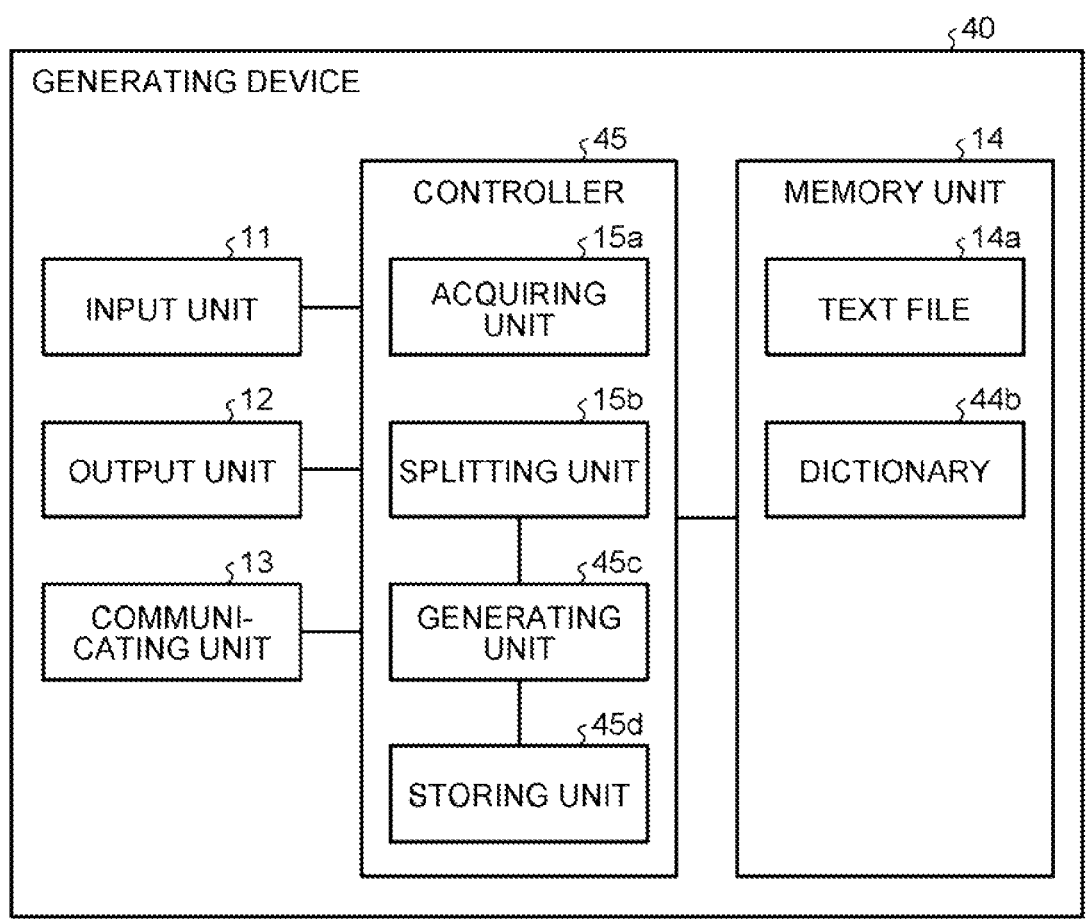
FIG. 7 is a diagram illustrating an example of a functional configuration of a generating device according to a second embodiment.

FIG. 7 is a diagram illustrating an example of a functional configuration of a generating device according to a second embodiment. As illustrated in FIG. 7, a generating device 40 includes a memory unit 14 and a controller 45. The controller 45 includes a generating unit 45c and a storing unit 45d, which is different from the controller 15 according to the first embodiment illustrated in FIG. 2. Further, the memory unit 14 stores a dictionary 44b, which is different from the memory unit 14 according to the first embodiment. Hereinafter, same reference numerals as FIG. 2 are denoted to units having the same function as the first embodiment and the description thereof will be omitted.

The dictionary 44b is generated by the generating unit 45c which will be described below and then stored in the memory unit 14 by the storing unit 45d which will be described below.

FIG. 8 is a diagram illustrating an example of a dictionary. In the example of FIG. 8, the dictionary 44b has a "phrase identifier" section in addition to the "writing" section, the "reading information" section, and the "positional information" section which are the same as the first embodiment. In the "phrase identifier" section, an identifier for identifying a phrase is registered. The contents of the sections are generated by the generating unit 45c.

The example of FIG. 8 illustrates that in the first record, a word "finals" included in a text indicated by the text file "Umiyama school advances to the finals. The Prime Minister, Yamakawa mentioned that he would want to pass the bill." is registered in the "writing" section. Further, the example of FIG. 8 illustrates that in the first record, "kessyou" which is a reading method of the finals is registered in the "reading information" section. Furthermore, the example of FIG. 8 illustrates that in the first record, the positional information "0" indicating the position of the word "finals" in the text is registered in the "positional information" section. The example of FIG. 8 illustrates that in the first record, an identifier "10" of the phrase including the word "finals" is registered in the "phrase identifier" section.

The generating unit 45c generates positional information indicating the position in the text of words split by the splitting unit 15b. Additionally, the generating unit 45c generates word strings of one to (N−1) words which are continuous to each of the words. The generating unit 45c generates positional information indicating a position of the word strings in the text. Further, the generating unit 45c generates identification information for identifying a phrase including the split words.

A specific example will be described. For example, the generating unit 45c first initializes values of the positional information n, a variable i, a variable j, and a variable s. In other words, the generating unit 45c sets the value of the positional information n to 0, and the values of the variables i, j, and s to 1, 0, and 10, respectively. The generating unit 45c generates a word string from an (i−j)-th word to an i-th word. If j=0, the i-th word is considered as a word string and the following processing is performed. Further, if an (i−w; w≤j)-th word does not exist, the generating unit 45c treats the (i−w)-th word as a space and generates a word string from the (i−j)-th word to the i-th word.

Further, if the newly generated word string, the reading information, a value of the positional information n, and a value of the phrase identifier s are registered in the dictionary 44b by the storing unit 45d, the generating unit 45c increases the value of the variable j by one and increases the value of the positional information n by one. The generating unit 45c judges whether the value of the variable j is smaller than a maximum coupling number N which is the maximum value of the number of the words coupled in the word string. If the value of the variable j is smaller than the maximum coupling number N, the generating unit 45c generates a word string from the i-th word to the (i+j)-th word again and performs processing same as the above-mentioned processing.

In the meantime, if the value of the variable j is larger than the maximum coupling number N, the generating unit 45c judges whether the i-th word is a symbol indicating the separation of a text, for example, a punctuation mark ".". If the i-th word is a symbol indicating the separation of a text, the generating unit 45c increases the value of the variable s by one. The generating unit 45c increases the value of the variable i by one and sets the value of the variable j to 0. Continuously, the generating unit 45c judges whether the value of the variable i is smaller than a total word count M which is the total number of the words obtained by the splitting unit 15b. If the value of the variable i is smaller than the total word count M, the generating unit 45c generates a word string from the (i−j)-th word to the i-th word again and performs processing same as the above-mentioned processing.

The storing unit 45d stores the words and word string, the corresponding reading information, the corresponding positional information n, and the phrase identifier s in the memory unit 14 so as to be associated with each other. A specific example will be described. For example, when the generating unit 45c generates the word string from the (i−j)-th word to the i-th word, the storing unit 45d performs the following processing. That is, the storing unit 45d registers the newly generated word string, the reading information corresponding to the newly generated word string, a value of positional information n, and a value of phrase identifier s in the sections of the "writing", "reading information", "positional information", and "phrase identifier" of the dictionary 44b, respectively. If a punctuation mark "." or a space is included in the words of the newly generated word string, the storing unit 45d may omit the processing of registering the word string, the reading information, the value of the positional information n, and the phrase identifier s in the dictionary 44b. This is because when the punctuation mark "." or the space is included in the words of the word string, the word string is not appropriate as a comparison target with a voice when the voice is recognized. Therefore, according to the storing unit

45d, the speed of generating the dictionary 44b becomes faster. Further, according to the storing unit 45d, it is possible to generate a dictionary 44b having a reduced amount of information.

As described above, the dictionary 44b is generated by the generating unit 45c and the storing unit 45d. For example, when the text indicated by the text file 14a is "Umiyama school advances to the finals. The Prime Minister, Yamakawa mentioned that he would want to pass the bill.", the dictionary 44b as illustrated in an example of FIG. 8 is generated. In the example of FIG. 8, the value of the maximum coupling number N is 3. The storing unit 15d registers the records as many as the total word count M x the maximum coupling number N−Σn (n=1, 2, . . . , N−1) in the dictionary 44b. Therefore, it is possible to generate the dictionary 44b having a reduced amount of information.

Further, if the transmission request of the dictionary 44b is received from a recognizing device 50 which will be described below, the storing unit 45d reads the dictionary 44b from the memory unit 14 and transmits the dictionary 44b to the communicating unit 13. The communicating unit 13 that has received the dictionary 44b transmits the dictionary 44b to the recognizing device 50 which will be described below through the network 30.

The controller 45 is an integrated circuit such as an ASIC (application specific integrated circuit) or an FPGA (field programmable gate array) or an electronic circuit such as a CPU (central processing unit) or an MPU (micro processing unit).

Functional Configuration of Recognizing Device 50

Figure 9:
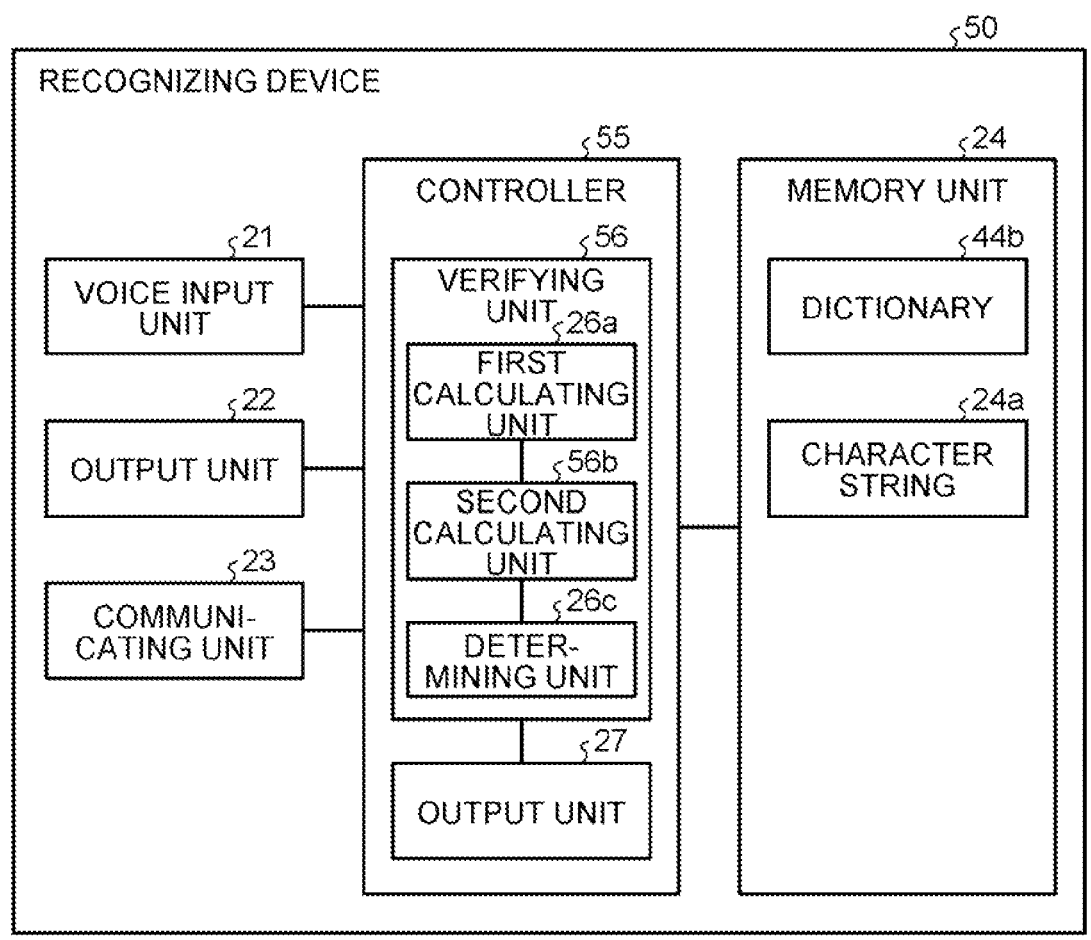
FIG. 9 is a diagram illustrating an example of a configuration of a recognizing device according to the second embodiment.

FIG. 9 is a diagram illustrating an example of a configuration of a recognizing device according to the second embodiment. As illustrated in FIG. 9, the recognizing device 50 includes a memory unit 24 and a controller 55. The controller 55 includes a second calculating unit 56b of a verifying unit 56, which is different from the controller 25 according to the first embodiment illustrated in FIG. 4. Further, the memory unit 24 stores the dictionary 44b, which is different from the memory unit 24 according to the first embodiment. Hereinafter, same reference numerals as FIG. 4 are denoted to units having the same function as the first embodiment and the description thereof will be omitted.

The dictionary 44b is stored in the memory unit 24 by a first calculating unit 26a.

Even though the second calculating unit 56b has the almost same function as the second calculating unit 26b of the first embodiment, the second calculating unit 56b is different from the second calculating unit 26b of the first embodiment as described below. The second calculating unit 56b refers to the dictionary 44b and judges only for the reading information having the same phrase identifier whether the values indicated by the positional information are in the ascending order, which is similar to the first embodiment. The second calculating unit 56b performs the following processing on the combination in which the values indicated by the positional information are judged to be in the ascending order. Specifically, among the combined reading information, the value indicated by the positional information corresponding to reading information which is closer to the heading between two coupled reading information, that is, adjacent reading information is substituted into the variable x, and the value indicated by the positional information corresponding to the reading information which is farther from the heading is substituted into the variable y. Therefore, the second calculating unit 56b calculates X and Y based on the following Equations (3) and (4).

$$X=(x/N)+1 \quad (3)$$

$$Y=(y/N)-(y\%N) \quad (4)$$

Here, N is the above-mentioned maximum coupling number. Further, "/" refers to a division operation for obtaining an integer remainder by rounding off to a whole number. "%" refers to a residue arithmetic.

The method that compares X and Y and calculates the connection score is the same as the first embodiment.

As described above, the second calculating unit 56b calculates the connection score only in the same phrase. Therefore, since the connection score is not calculated when texts have different contents, it is possible to more precisely recognize the voice.

The controller 55 is an integrated circuit such as an ASIC (application specific integrated circuit) or an FPGA (field programmable gate array) or an electronic circuit such as a CPU (central processing unit) or an MPU (micro processing unit).

Flow of Processing

Figure 10:
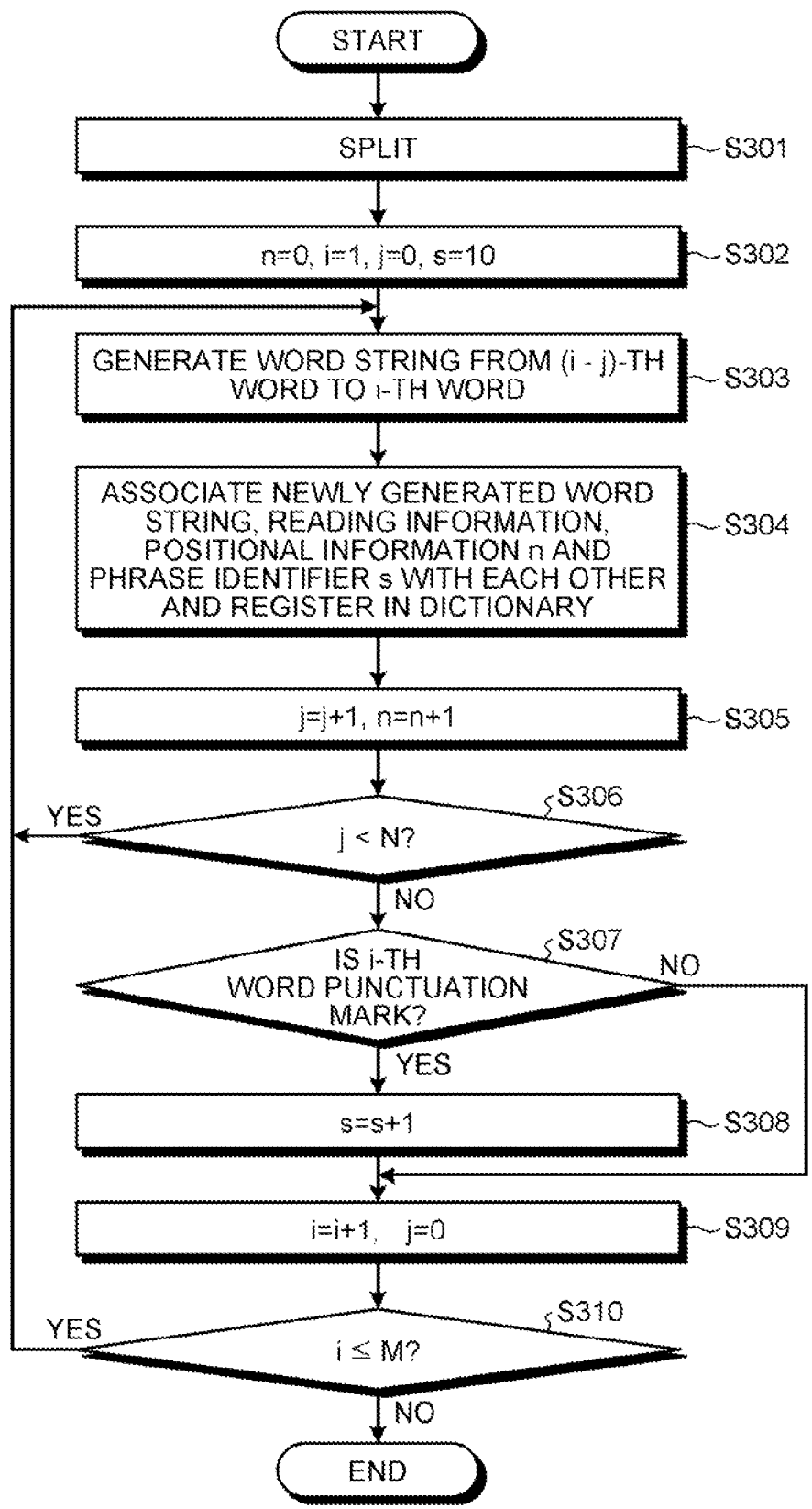
FIG. 10 is a flowchart illustrating a sequence of a generation processing according to the second embodiment.

Next, the flow of the processing of the generating device 40 according to the embodiment will be described. FIG. 10 is a flowchart illustrating a sequence of a generation processing according to the second embodiment. The generation processing is performed when an instruction that performs the generation processing is input from the input unit 11 to the controller 45.

As illustrated in FIG. 10, the splitting unit 15b splits the text indicated by the text file 14a into words (S301). The generating unit 45c sets a value of the positional information n to 0, the values of the variables i, j, and s to 1, 0, and 10, respectively (S302). The generating unit 45c generates a word string from an (i−j)-th word to an i-th word (S303).

The storing unit 45d registers the newly generated word string, reading information corresponding to the newly generated word string, a value of positional information n, and a value of a phrase identifier s in the sections of the "writing", "reading information", "positional information", and "phrase identifier" of the dictionary 44b (S304). The generating unit 45c increases the value of the variable j by one and increases the value of positional information n by one (S305). The generating unit 45c judges whether the value of the variable j is smaller than a maximum coupling number N which is the maximum value of the number of the words coupled in the word string (S306). If the value of the variable j is smaller than the maximum coupling number N (Yes in S306), the procedure returns to step S303.

In contrast, if the value of the variable j is larger than the maximum coupling number N (No in S306), the generating unit 45c judges whether the i-th word is a symbol indicating the separation of a text, for example, a punctuation mark "." (S307). If the i-th word is a symbol indicating the separation of a text (Yes in S307), the generating unit 45c increases the value of the variable s by one (S308). The generating unit 45c increases the value of the variable i by one and sets the value of the variable j to 0 (S309). The generating unit 45c judges whether the value of the variable i is smaller than a total word count M which is the total number of the words obtained by the splitting unit 15b (S310). If the value of the variable i is smaller than the total word count M (Yes in S310), the procedure returns to step S303. In contrast, if the value of the variable i is larger than the total word count M (No in S310), the processing is completed. Further, if the i-th word is not the symbol indicating the separation of a text (No in S307), the procedure proceeds to S309.

Figure 11:
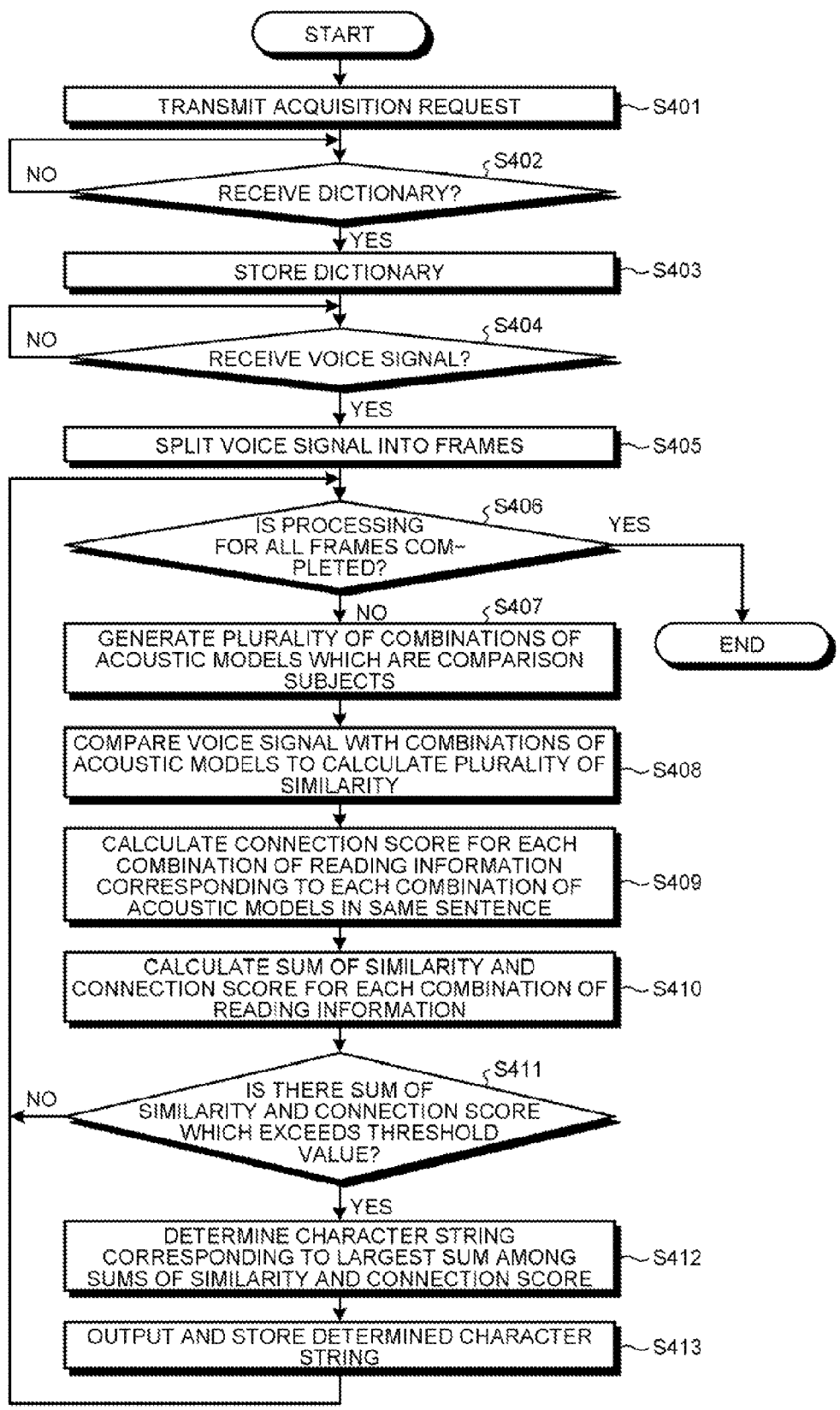
FIG. 11 is a flowchart illustrating a sequence of a recognition processing according to the second embodiment.

Next, the flow of processing of the recognizing device 50 according to the embodiment will be described. FIG. 11 is a flowchart illustrating a sequence of the recognition processing according to the second embodiment. The recognition processing is performed when an instruction that performs the recognition processing is input from the manipulation receiving unit (not illustrated) to the controller 55.

Since steps S401 to S408 and S410 to S413 illustrated in FIG. 11 are the same processing as the above-described steps S201 to S208 and S210 to S213, the description thereof will be omitted. As illustrated in FIG. 11, the second calculating unit 56b refers to the dictionary 44b and calculates the connection score only between reading information having the same phrase identifier (S409).

Effect of Second Embodiment

As described above, the recognizing device 50 compares the input voice signal with the plurality of combinations of acoustic models corresponding to the plurality of combinations of the reading information registered in the dictionary 44b and calculates a similarity for every combination of the acoustic models. Further, the recognizing device 50 performs the following processing based on the positional information of the word or the character string corresponding to the reading information combined when the similarity is calculated. That is, the recognizing device 50 calculates, with respect to the words or the character strings corresponding to the plurality of combined reading information, the connection score indicating a proximity of the position in the text between words, between character strings, or between a word and a character string for every combination of the reading information. The recognizing device 50 determines the character string corresponding to the largest sum that exceeds a threshold value among the plurality of calculated sums as the character string corresponding to the voice signal. According to the recognizing device 50, even when an utterer utters a character string connecting a plurality of words which is included in a text but are not adjacent to each other in the text and the character string is input as a voice signal, it is possible to recognize the voice uttered by the utterer. Therefore, according to the recognizing device 50, it is possible to precisely recognize the voice.

Further, the generating device 40 may generate the dictionary 44b so as to allow the recognizing device 50 to precisely recognize the voice.

In addition, since the generating device 40 registers the records as many as the total word count M×the maximum coupling number N−Σn (n=1, 2, . . . , N−1) in the dictionary 44b, it is possible to generate the dictionary 44b having a reduced amount of information.

Furthermore, according to the recognizing device 50, the connection score is calculated only in the same text. Therefore, since the connection score is not calculated when texts have different contents, it is possible to more precisely recognize the voice.

Third Embodiment

In a third embodiment, it is described that the connection score is corrected using a predetermined automaton.

Functional Configuration of Recognizing Device 60

Figure 12:
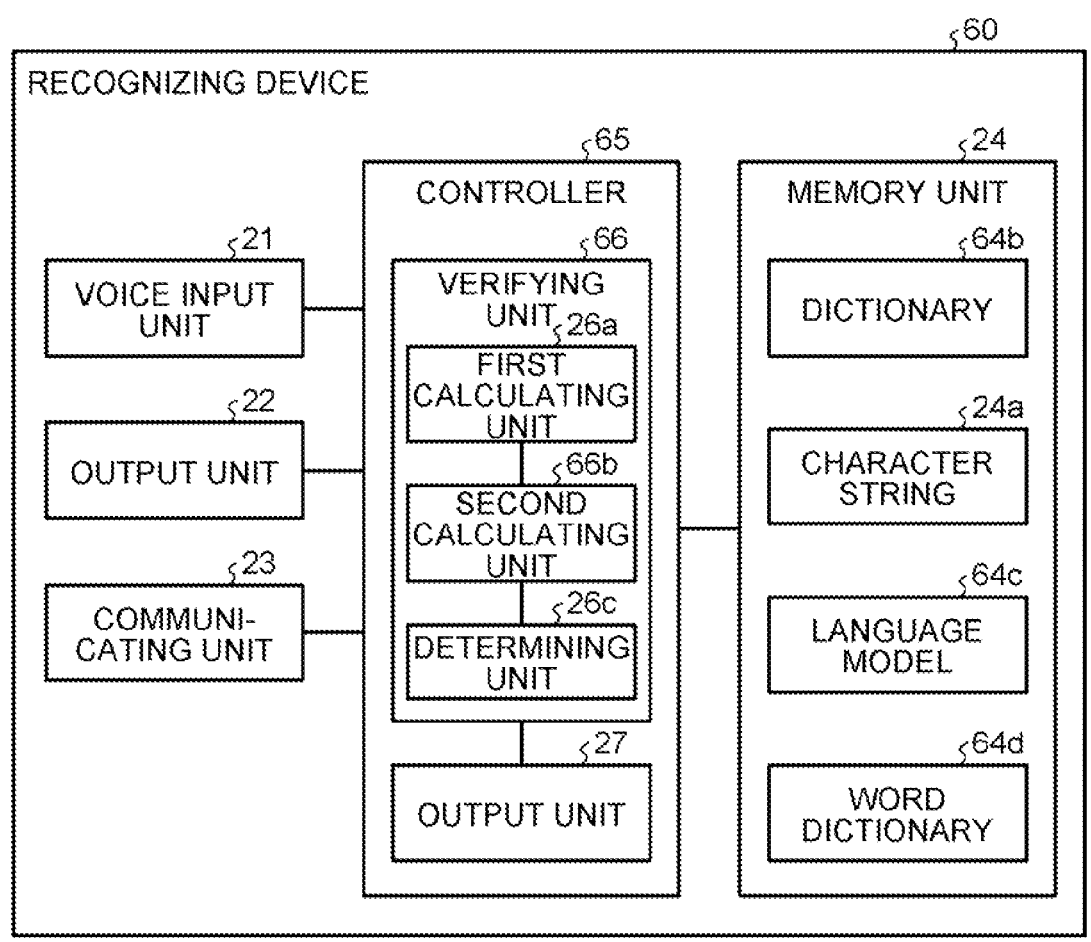
FIG. 12 is a diagram illustrating an example of a configuration of a recognizing device according to a third embodiment.

FIG. 12 is a diagram illustrating an example of a configuration of a recognizing device according to a third embodiment. As illustrated in FIG. 12, a recognizing device 60 includes a memory unit 24 and a controller 65. The controller 65 includes a second calculating unit 66b of a verifying unit 66, which is different from the controller 25 according to the first embodiment illustrated in FIG. 4. Further, the memory unit 24 stores a dictionary 64b. The dictionary 64b is the same as the dictionary 14b according to the first embodiment and the dictionary 44b according to the second embodiment. The memory unit 24 stores a language model 64c and a word dictionary 64d. Hereinafter, same reference numerals as FIGS. 4 and 9 are denoted to units having the same function as the first and second embodiments and the description thereof will be omitted.

The dictionary 64b is stored in the memory unit 24 by the first calculating unit 26a.

Figures 13, 14:
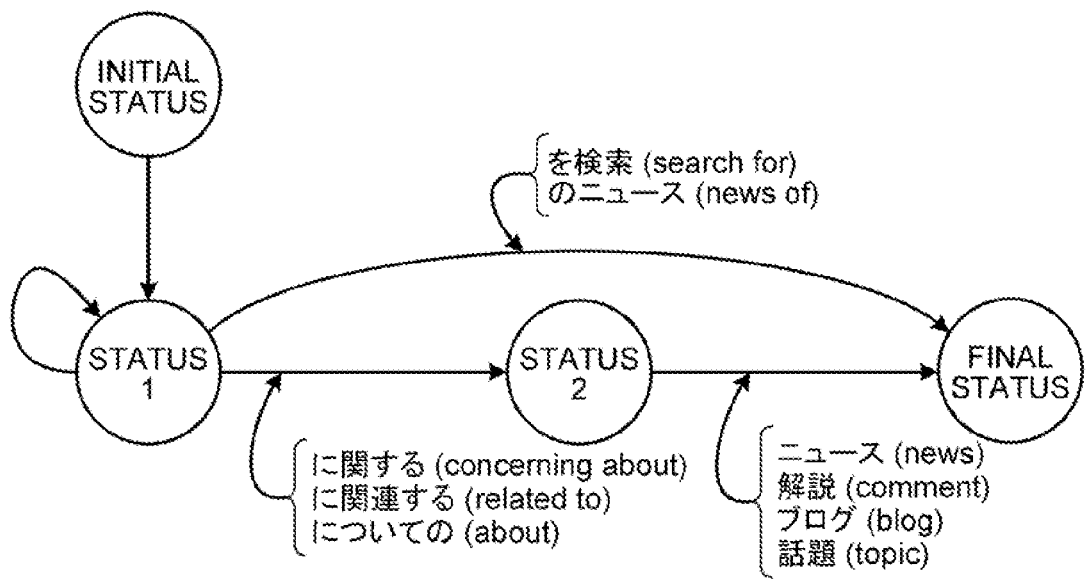
FIG. 13 is a diagram illustrating an example of a language model.
FIG. 14 is a diagram illustrating an example of a word dictionary.

FIG. 13 is a diagram illustrating an example of the language model. In an example of FIG. 13, the language model 64c is an automaton. The example of FIG. 13 illustrates that if a character string such as "に関する (concerning about)", "に関連する (related to)" or "についての (about)" is added to an arbitrary word or character string, a status 1 is transitioned into a status 2. Further, the example of FIG. 13 illustrates that if a word such as "ニュース (news)", "解説 (comment)", "ブログ (blog)", or "話題 (topic)" is added to the character string of "に関する (concerning about)", "に関連する (related to)" or "についての (about)" in the status 2, the status 2 is transitioned into a final status. Further, the example of FIG. 13 illustrates that if a character string such as "を検索 (search for)" or "のニュース (news of)" is added to an arbitrary word, the status 1 is transitioned into the final status.

FIG. 14 is a diagram illustrating an example of a word dictionary. In an example of FIG. 14, the word dictionary 64d has a "writing" section and a "reading information" section. In the word dictionary 64d of the example of FIG. 14, the writing and the reading information of a word or a character string when the status indicated by the language model 64c is transitioned are registered so as to be associated with each other.

The second calculating unit 66b has the function of the second calculating unit 26b of the first embodiment or the second calculating unit 56b of the second embodiment, but is different from the second calculating units 26b and 56b as described below. Specifically, the second calculating unit 66b calculates the connection score, which is the same as the first and second embodiments. But, the second calculating unit 66b corrects the connection score based on the language model 64c and the word dictionary 64d, which is different from the first and second embodiments.

For example, it is assumed that a connection score S for the combined reading information "kessyouniumiyamagakuingashinsyutsu" (writing: Umiyama school advances to the finals) is calculated. In this case, the second calculating unit 66b refers to the language model 64c and the word dictionary 64d, but does not correct the connection score S because a status of the combined reading information is the "status 1".

Further, for example, it is assumed that a connection score Q for the combined reading information "kessyouniumiyamagakuingashinsyutsunonyusu" (writing: news that Umiyama school advances to the finals) is calculated. In this case, the second calculating unit 66b corrects the connection score S calculated for the reading information "kessyouniumiyamagakuingashinsyutsu" corresponding to the status 1 before being transitioned into the final status rather than the connection score Q. For example, the second calculating unit 66b refers to the language model 64c and the word dictionary 64d and corrects the connection score by adding a predetermined value to the connection score S because the status corresponding to the combined reading information is transitioned from the "status 1" to the "final status". In addition, the connection score may be corrected by multiplying a predetermined value, for example, a value indicating 100% to the connection score S.

Further, for example, it is assumed that a connection score S' for a combined reading information "yamakawasourigatooshitaihouan" (writing: an amended law that the Prime Minister, Yamakawa wants to pass) is calculated. In this case, the second calculating unit 66b refers to the language model 64c and the word dictionary 64d, but does not correct the connection score S' because the status corresponding to the combined reading information is the "status 1".

Further, for example, it is assumed that a connection score Q' for the combined reading information "yamakawasourigatooshitaihouannitsuitenoburogu" (writing: a blog about an amended law that the Prime Minister, Yamakawa wants to pass) is calculated. In this case, the second calculating unit 66b corrects the connection score S' calculated for the reading information "yamakawasourigatooshitaihouan" corresponding to the status 1 before being transitioned from the status 1 to the status 2, and from the status 2 to the final status, rather than the connection score Q'. For example, the second calculating unit 66b refers to the language model 64c and the word dictionary 64d and corrects the connection score by adding a predetermined value two times to the connection score S' because the status corresponding to the combined reading information is transitioned from the "status 1" to the "status 2", and from the "status 2" to the "final status". In addition, the connection score may be corrected by multiplying a predetermined value, for example, a value indicating 100% two times to the connection score S.

The controller 65 is an integrated circuit such as an ASIC (application specific integrated circuit) or an FPGA (field programmable gate array) or an electronic circuit such as a CPU (central processing unit) or an MPU (micro processing unit).

Flow of Processing

Figure 15:
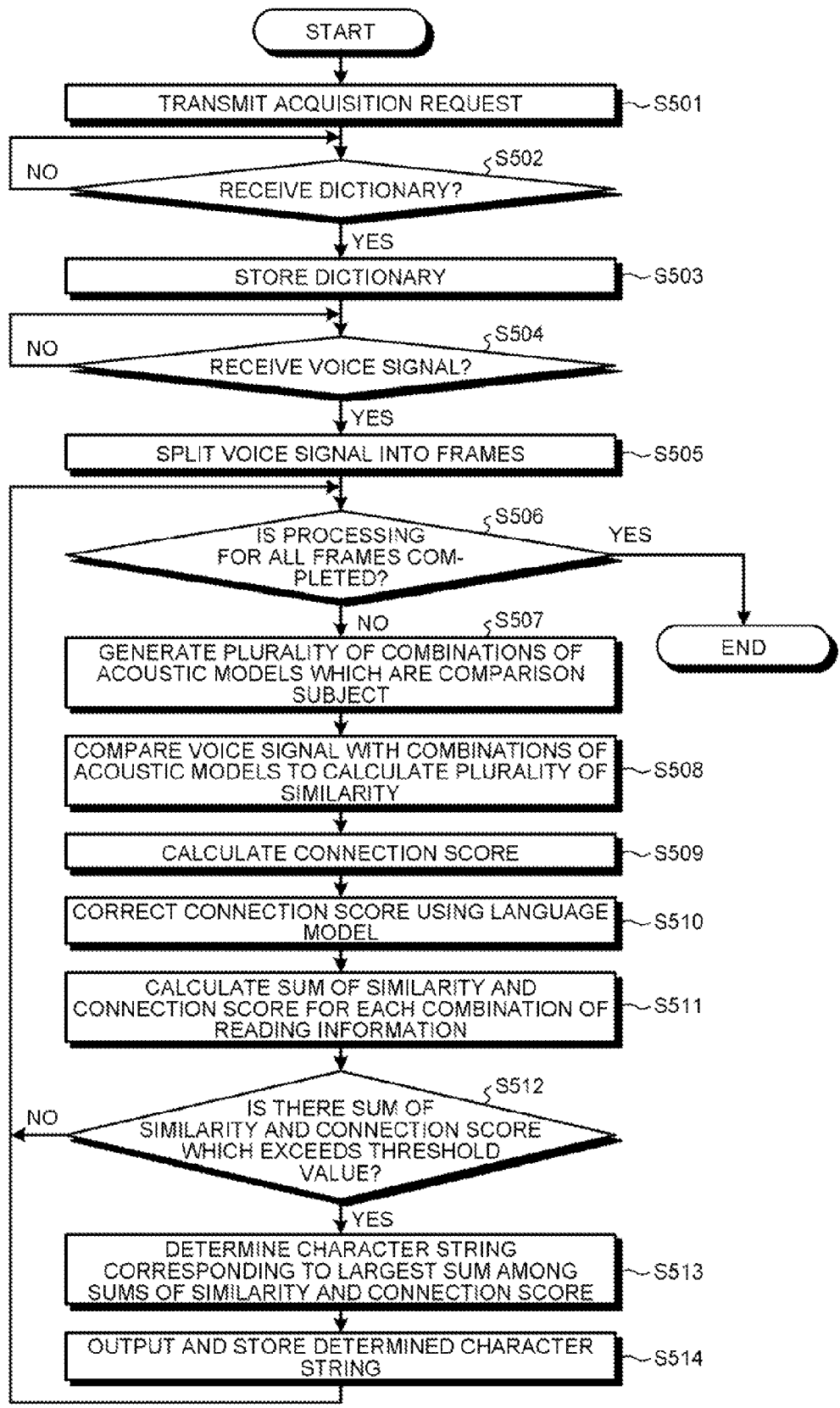
FIG. 15 is a flowchart illustrating a sequence of a recognition processing according to the third embodiment.

Next, the flow of the processing of the recognizing device 60 according to the embodiment will be described. FIG. 15 is a flowchart illustrating a sequence of a recognition processing according to a third embodiment. The recognition processing is performed when an instruction that performs the recognition processing is input from a manipulation receiving unit (not illustrated) to the controller 65.

Since steps S501 to S509 and S511 to S514 illustrated in FIG. 15 are the same processing as the above-described steps S401 to S413 or steps S201 to S213, the description thereof will be omitted. As illustrated in FIG. 15, the second calculating unit 66b refers to the language model 64c and the word dictionary 64d and when the status is transitioned, corrects the connection score calculated in the status 1 (S510).

Effect of Third Embodiment

As described above, the recognizing device 60 compares the input voice signal with the plurality of combinations of acoustic models corresponding to the plurality of combinations of the reading information registered in the dictionary 64b and calculates a similarity for every combination of the acoustic models. Further, the recognizing device 60 performs the following processing based on the positional information of the word or the character string corresponding to the reading information combined when the similarity is calculated. That is, the recognizing device 60 calculates, with respect to the words or the character strings corresponding to the plurality of combined reading information, the connection score indicating a proximity of the position in the text between words, between character strings, or between a word and a character string for every combination of the reading information. The recognizing device 60 determines the character string corresponding to the largest sum that exceeds a threshold value among the plurality of calculated sums as the character string corresponding to the voice signal. According to the recognizing device 60, even when an utterer utters a character string connecting a plurality of words which is included in a text but are not adjacent to each other in the text and the character string is input as a voice signal, it is possible to recognize the voice uttered by the utterer. Therefore, according to the recognizing device 60, it is possible to precisely recognize the voice.

Further, the generating device according to the present embodiment may generate the dictionary 64b so as to allow the recognizing device 60 to precisely recognize the voice.

In addition, since the generating device according to the present embodiment registers the records as many as the total word count M×the maximum coupling number N−Σn (n=1, 2, . . . , N−1) in the dictionary 64b, it is possible to generate the dictionary 64b having a reduced amount of information.

Furthermore, according to the recognizing device 60, the connection score is calculated only in the same phrase. Therefore, since the connection score is not calculated when phrases have different contents, it is possible to more precisely recognize the voice.

Moreover, according to the recognizing device 60, the connection score is corrected using a language model such as an automaton so that the recognition rate of a specific uttering pattern may be improved by registering the specific uttering pattern in the language model.

Fourth Embodiment

In a fourth embodiment, it is described that the connection score is corrected using information indicating whether it is proper to connect two word classes of a connection part of two adjacent reading information in the combination of the reading information (word or character string corresponding to the reading information).

Functional configuration of generating device 70

Figure 16:
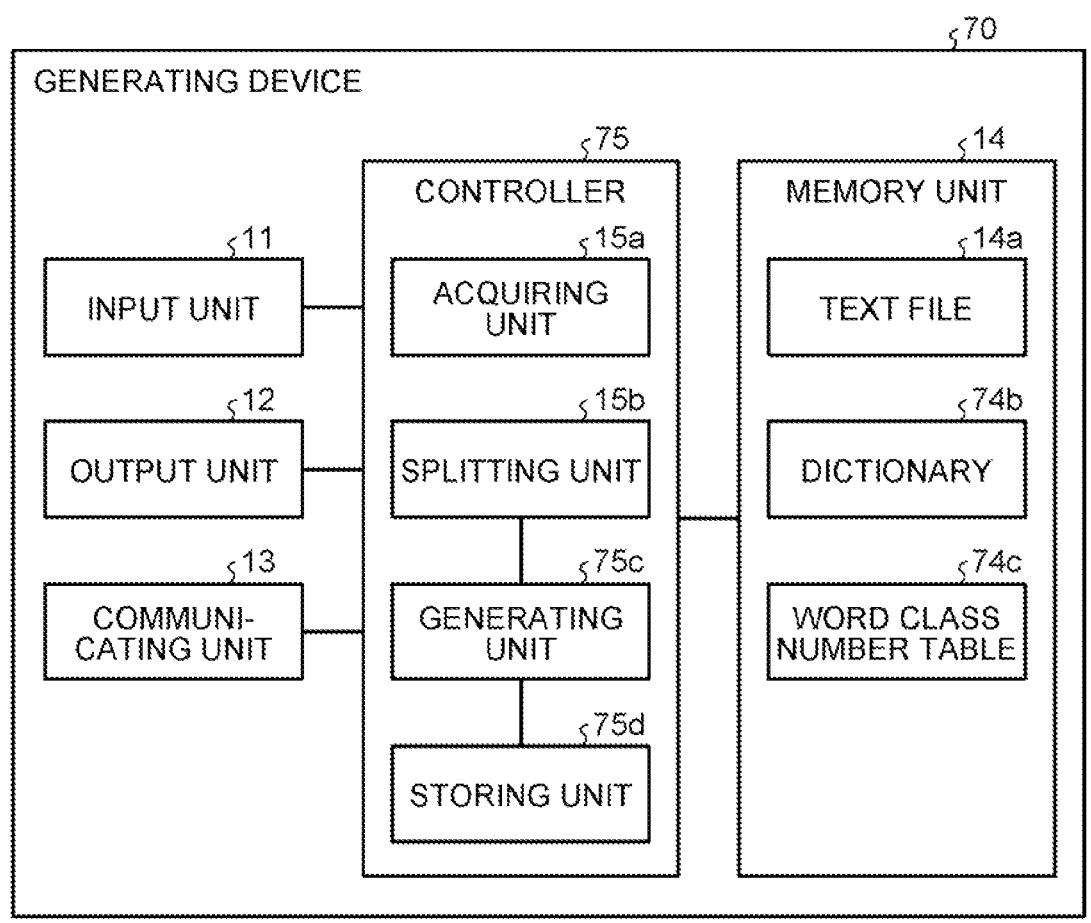
FIG. 16 is a diagram illustrating an example of a configuration of a generating device according to a fourth embodiment.

FIG. 16 is a diagram illustrating an example of a configuration of a recognizing device according to a fourth embodiment. As illustrated in FIG. 16, a generating device 70 includes a memory unit 14 and a controller 75. The controller 75 includes a generating unit 75c and a storing unit 75d, which is different from the controller 15 according to the first embodiment illustrated in FIG. 2. Further, the memory unit 14 stores a dictionary 74b and a word class number table 74c, which is different from the memory unit 14 according to the first embodiment. Hereinafter, same reference numerals as FIGS. 2 and 7 are denoted to units having the same function as the first, second, and third embodiments and the description thereof will be omitted.

The dictionary 74b is generated by the generating unit 75c which will be described below and then stored in the memory unit 14 by the storing unit 75d which will be described below.

FIG. 17 is a diagram illustrating an example of a word class number table. An example of FIG. 17 illustrates that in the word class number table 74c, if a word class of a heading word is a noun and a word class of an ending word is a noun, the word class number is "1".

FIG. 18 is a diagram illustrating an example of a dictionary. In the example of FIG. 18, the dictionary 74b has a "word class number" section in addition to the "writing" section, the "reading information" section, and the "positional information" section which are the same as the first embodiment. In the section of the "word class number", a word class number which is a number indicating the combination of a word class of a heading word of words or word strings registered in the "writing" section and a word class of an ending word thereof is registered. The word class number is acquired from the word class number table 74c by the generating unit 75c, which will be described below and registered in the dictionary 74b by the storing unit 75d which will be described below.

The generating unit 75c acquires the word class number indicating the combination of the word class of the heading word and the word class of the ending word with respect to the split words or the generated word strings by referring to the word class number table 74c.

The storing unit 75d has a following function in addition to the function of any one of the storing units of the first to third embodiments. In other words, the storing unit 75d registers the word class number acquired by the generating unit 75c in the "word class number" section of the dictionary 74b.

The controller 75 is an integrated circuit such as an ASIC (application specific integrated circuit) or an FPGA (field programmable gate array) or an electronic circuit such as a CPU (central processing unit) or an MPU (micro processing unit).

Functional Configuration of Recognizing Device 80

Figure 19:
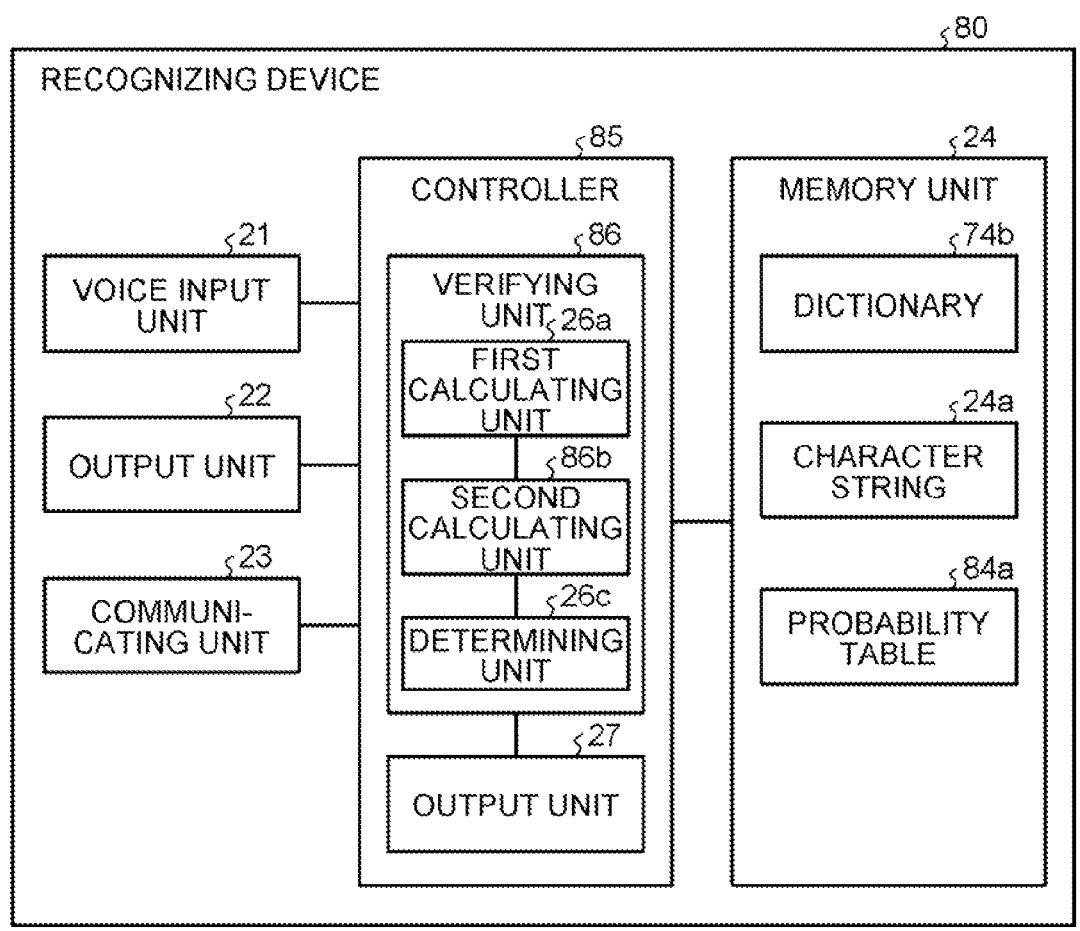
FIG. 19 is a diagram illustrating an example of a configuration of a recognizing device according to the fourth embodiment.

FIG. 19 is a diagram illustrating an example of a configuration of a recognizing device according to a fourth embodiment. As illustrated in FIG. 19, the recognizing device 80 includes a memory unit 24 and a controller 85. The controller 85 includes a second calculating unit 86b of a verifying unit 86, which is different from the controller 25 according to the first embodiment illustrated in FIG. 4. Further, the memory unit 24 stores a dictionary 74b and a probability table 84a, which is different from the memory unit 24 according to the first embodiment. Hereinafter, same reference numerals as FIGS. 4, 9, and 12 are denoted to units having the same function as the first to third embodiments and the description thereof will be omitted.

The dictionary 74b is stored in the memory unit 24 by a first calculating unit 26a.

FIG. 20 is a diagram illustrating an example of a probability table. In the probability table 84a of the example of FIG. 20, the longitudinal axis represents a word class number of a word or a character string in the front among combinations of two words or word strings or a word and a word string. Further, in the probability table 84a of the example of FIG. 20, the horizontal axis represents a word class number of a word or a word string in the back among combinations of two words or word strings or a word and a word string. In the probability table 84a of the example of FIG. 20, if the word class number of the front word is 1 and the word class number of the rear word is 1, probability of 100% is registered.

Even though the second calculating unit 86b has the almost same function as the second calculating unit of any one of the first to third embodiments, the second calculating unit 86b is different from the second calculating unit of any one of the first to third embodiments as described below. In other words, the second calculating unit 86b first specifies a combined adjacent words or character strings. The second calculating unit 86b refers to the probability table 84a and acquires a value indicating whether it is proper to combine the word classes from two word class numbers of the specified adjacent words or character strings or a word and a character string, for example, a probability that two words or two character strings or a word and a character string are connected. The second calculating unit 86b multiplies the acquired probability and the connection score of the corresponding combination to correct the connection score.

The controller 85 is an integrated circuit such as an ASIC (application specific integrated circuit) or an FPGA (field programmable gate array) or an electronic circuit such as a CPU (central processing unit) or an MPU (micro processing unit).

Flow of Processing

Figure 21:
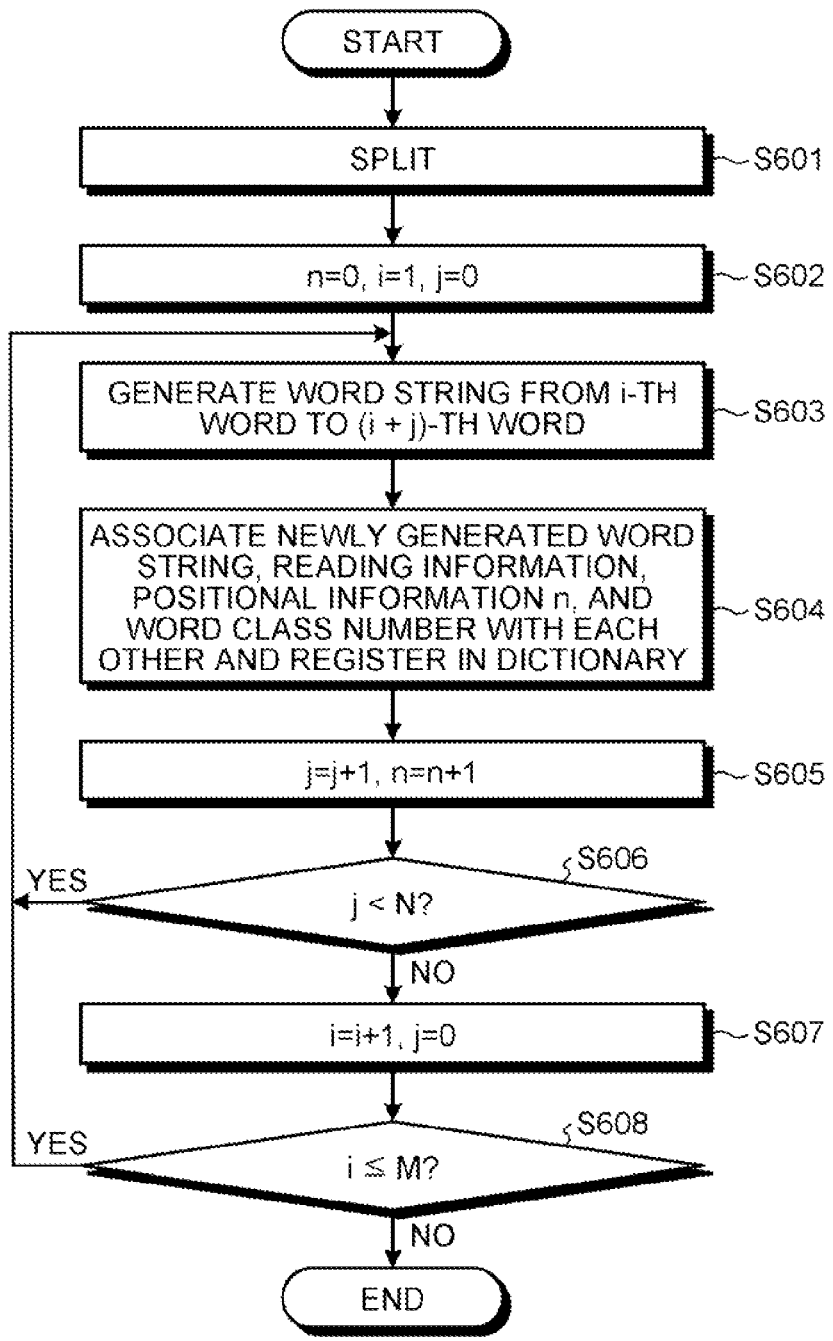
FIG. 21 is a flowchart illustrating a sequence of a generation processing according to the fourth embodiment.

Next, the flow of the processing of the generating device 70 according to the embodiment will be described. FIG. 21 is a flowchart illustrating a sequence of a generation processing according to a fourth embodiment. The generation processing is performed when an instruction that performs the generation processing is input from the input unit 11 to the controller 75.

Since processing of steps S601 to S603 and S605 to S608 illustrated in FIG. 21 are the same as the processing of the above-described steps S101 to S103 and S105 to S108, the description thereof will be omitted. As illustrated in FIG. 21, the storing unit 75d registers the word class number in the dictionary 74b in addition to the functions of the storing units of the first to third embodiments (S604).

Figure 22:
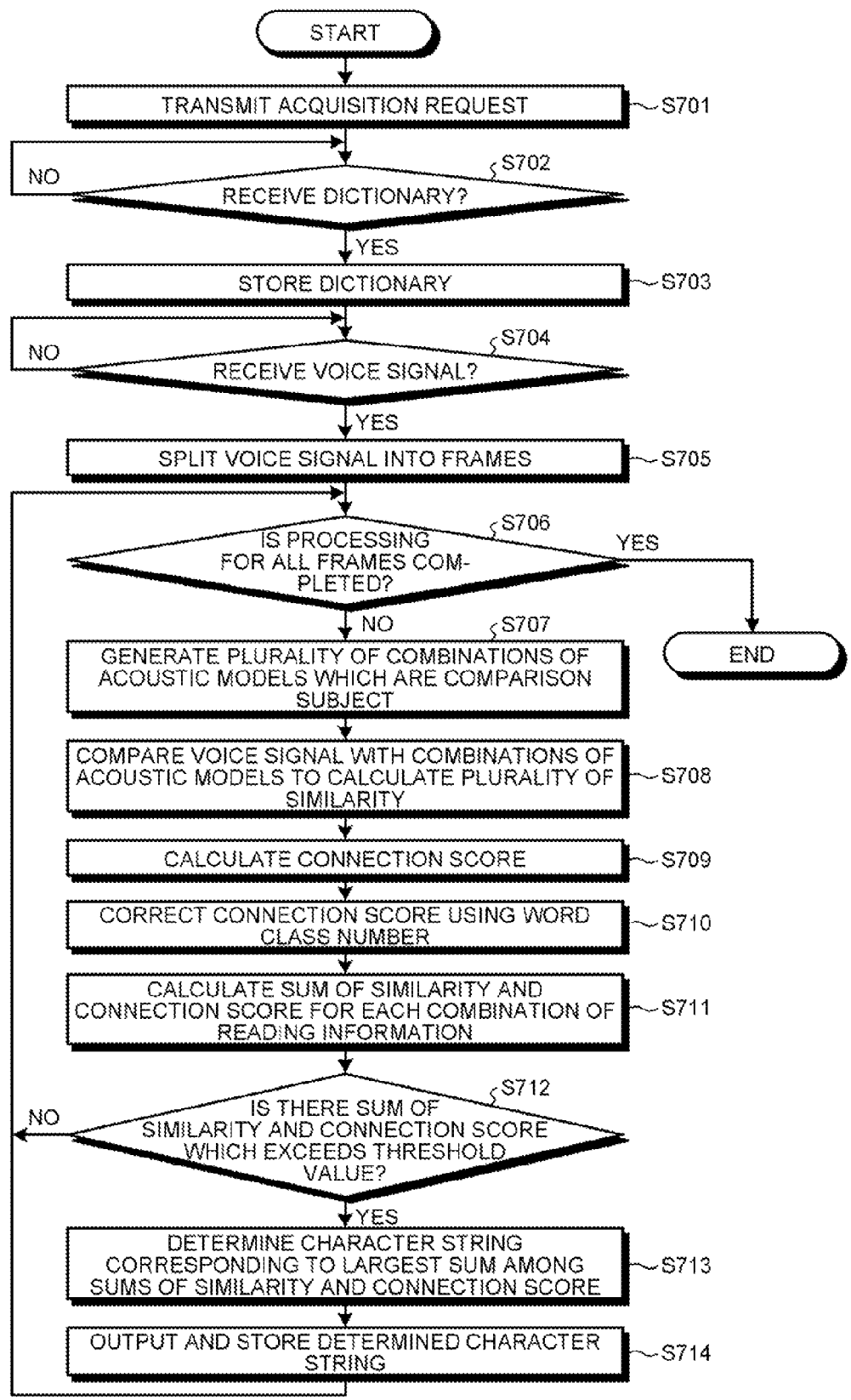
FIG. 22 is a flowchart illustrating a sequence of a recognition processing according to the fourth embodiment.

Next, the flow of processing of the recognizing device 80 according to the present embodiment will be described. FIG. 22 is a flowchart illustrating a sequence of a recognition processing according to the fourth embodiment. The recognition processing is performed when an instruction that performs the recognition processing is input from a manipulation receiving unit (not illustrated) to the controller 85.

Since steps S701 to S709 and S711 to S714 illustrated in FIG. 22 are the same processing as the above-described steps S501 to S509 and S511 to S514, the description thereof will be omitted. As illustrated in FIG. 22, the second calculating unit 86b refers to the probability table 84a and corrects the connection score using the word class number (S710).

Effect of Fourth Embodiment

As described above, the recognizing device 80 compares the input voice signal with the plurality of combinations of acoustic models corresponding to the plurality of combinations of the reading information registered in the dictionary 74b and calculates a similarity for every combination of the acoustic models. Further, the recognizing device 80 performs the following processing based on the positional information of the word or the character string corresponding to the reading information combined when the similarity is calculated. That is, the recognizing device 80 calculates, with respect to the words or the character strings corresponding to the plurality of combined reading information, the connection score indicating a proximity of the position in the text between words, between character strings, or between a word and a character string for every combination of the reading information. The recognizing device 80 determines the character string corresponding to the largest sum that exceeds a threshold value among the plurality of calculated sums as the character string corresponding to the voice signal. According to the recognizing device 80, even when an utterer utters a character string connecting a plurality of words which is included in a text but are not adjacent to each other in the text and the character string is input as a voice signal, it is possible to recognize the voice uttered by the utterer. Therefore, according to the recognizing device 80, it is possible to precisely recognize the voice.

Further, the generating device 70 may generate the dictionary 74b so as to allow the recognizing device 80 to precisely recognize the voice.

In addition, since the generating device 70 registers the records as many as the total word count M×the maximum coupling number N−Σn (n=1, 2, . . . , N−1) in the dictionary 74b, it is possible to generate the dictionary 74b having a reduced amount of information.

Furthermore, according to the recognizing device 80, the connection score is calculated only in the same phrase. Therefore, since the connection score is not calculated when phrases have different contents, it is possible to more precisely recognize the voice.

Moreover, according to the recognizing device 80, since the character string corresponding to the voice signal is determined based on the connection score to which the suitability of the word class is added, it is possible to more precisely recognize the voice.

Even though embodiments relating to a disclosed device have been described, the present invention may be embodied by various forms in addition to the above-described embodiments. Therefore, hereinafter, other embodiments than the embodiments included in the present invention will be described.

Further, among the processing described in the embodiments, all or some of processing that is described to be automatically performed may be manually performed.

Further, among the processing described in the embodiments, all or some of the processing that is described to be manually performed may be automatically performed by a known method.

Further, in accordance with various loads or usage circumstances, the processing in each step of the processing described in the embodiments may be subdivided or combined. In addition, some steps may be omitted.

Furthermore, in accordance with various loads or usage circumstances, the processing order in the steps of the processing described in the embodiments may be changed.

Moreover, the components of the devices illustrated in the drawings are functional and conceptual components. Therefore, it is not necessary to have the same physical configuration as illustrated in the drawings. In other words, a specific break-up or combined status of the devices is not limited to the status illustrated in the drawings, but all or some of the devices may be configured to be functionally or physically broken or combined in a predetermined unit in accordance with the various loads or usage circumstances.

Generating Program

Figure 23:
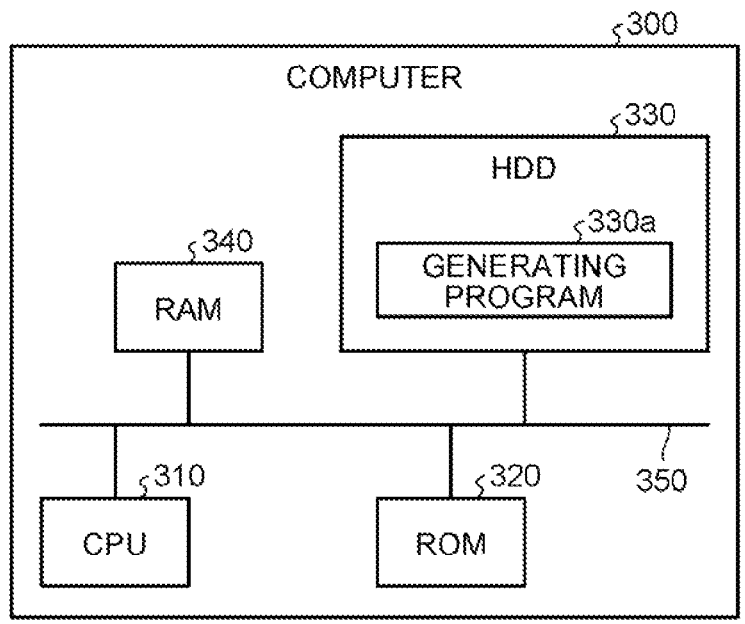
FIG. 23 is a diagram illustrating a computer that executes a generating program.

Further, the various processing of the generating devices described in the embodiments may be embodied by executing a program that is prepared in advance in a computer system such as a personal computer or a work station. Hereinafter, referring to FIG. 23, an example of a computer that executes a generating program having the same function as the generating device described in the embodiments will be described. FIG. 23 is a diagram illustrating a computer that executes the generating program.

As illustrated in FIG. 23, a computer 300 includes a CPU (central processing unit) 310, a ROM (read only memory) 320, an HDD (hard disc drive) 330, and a RAM (random access memory) 340. Parts of the components 310 to 340 are connected through a bus 350.

A program such as an OS (operating system) is stored in the ROM 320.

In the HDD 330, a generating program 330a that exhibits the same functions as the splitting unit, the generating unit, and the storing unit of the generating device described in any one of the embodiments is stored in advance. Further, the generating program 330a may be appropriately divided.

Further, the CPU 310 reads out the generating program 330a from the HDD 330 to execute the program.

In addition, in the HDD 330, information stored in the memory unit of any one of the above-described embodiments, for example, a text file, a dictionary, or a word class number table is installed.

Furthermore, the CPU 310 reads out the text file, the dictionary, or the word class number table to be stored in the RAM 340. In addition, the CPU 310 uses various information stored in the RAM 340 to execute the generating program. As for the data stored in the RAM 340, it is not necessary to store all data in the RAM 340, but only data used for the processing may be stored in the RAM 340.

Moreover, it is not necessary to store the above-mentioned generating program in the HDD 330 from the initial stage.

For example, the program is stored in a "portable physical media" such as a flexible disc (FD), a CD-ROM, a DVD disc, a magneto-optical disc, or an IC card which is inserted in the computer 300. Therefore, the computer 300 may read out the program from the portable physical media to execute the program.

Moreover, the program may be stored in another computer (or a server) which is connected to the computer 300 through a public line, the Internet, LAN, or WAN. The computer 300 may read out the program from the other computer to execute the program.

Recognizing Program

Figure 24:
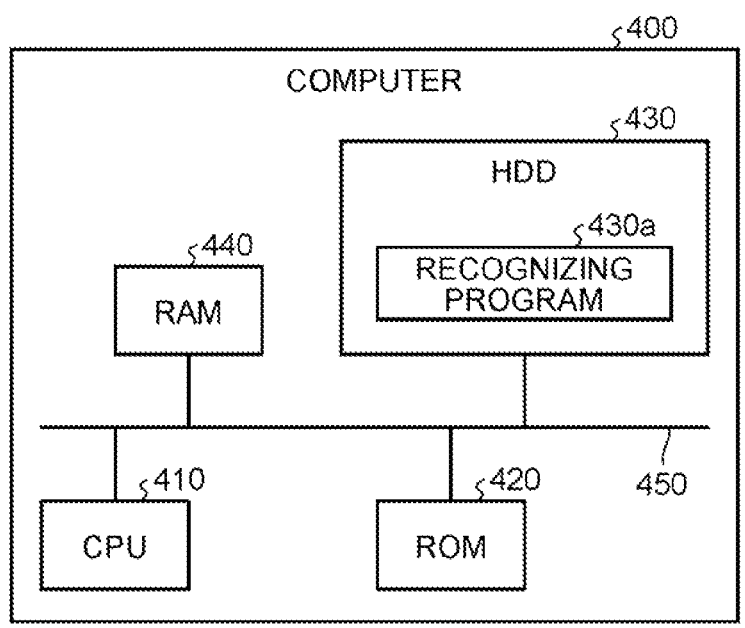
FIG. 24 is a diagram illustrating a computer that executes a recognizing program.

Further, the various processing of the generating devices described in the embodiments may be embodied by executing a program that is prepared in advance in a computer system such as a personal computer or a work station. Hereinafter, referring to FIG. 24, an example of a computer that executes a generating program having the same function as the generating device described in the embodiments will be described. FIG. 24 is a diagram illustrating a computer that executes a recognizing program.

As illustrated in FIG. 24, a computer 400 includes a CPU 410, a ROM 420, an HDD 430, and a RAM 440. Parts of the components 410 to 440 are connected through a bus 450.

A program such as an OS (operating system) is stored in the ROM 420.

In the HDD 430, a recognizing program 430a that exhibits the same functions as the first calculating unit, the second calculating unit, the determining unit, and the output unit of the recognizing device described in any one of the embodiments is stored in advance. Further, the recognizing program 430a may be appropriately divided.

Further, the CPU 410 reads out the recognizing program 430a from the HDD 430 to execute the program.

In addition, in the HDD 430, information stored in the memory unit of any one of the above-described embodiments, for example, a dictionary, a language model, a word dictionary, or a probability table is installed.

Further, the CPU 410 reads out the dictionary, the language model, the word dictionary, or the probability table to be stored in the RAM 440. In addition, the CPU 410 uses various information stored in the RAM 440 to execute the generating program. As for the data stored in the RAM 440, it is not necessary to store all data in the RAM 440, but only data used for the processing may be stored in the RAM 440.

Furthermore, it is not necessary to store the above-mentioned generating program in the HDD 430 from the initial stage.

For example, the program is stored in a "portable physical media" such as a flexible disc (FD), a CD-ROM, a DVD disc, a magneto-optical disc, or an IC card which is inserted in the computer 400. Therefore, the computer 400 may read out the program from the portable physical media to execute the program.

Moreover, the program may be stored in another computer (or a server) which is connected to the computer 400 through a public line, the Internet, LAN, or WAN. The computer 400 may read out the program from the other computer to execute the program.

According to an aspect of a recognizing device of the present invention, it is possible to precisely recognize a voice.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A recognizing device, comprising:
   a memory that stores words included in a text and positional information indicating a position of the words in an ascending numerical order from a heading in the text; and
   a processor coupled to the memory, wherein the processor executes a process comprising:
      comparing an input voice signal with reading information of a character string that connects a plurality of words stored in the memory unit to calculate a similarity;
      calculating a connection score indicating a proximity between the plurality of connected words based on positional information indicating a position of the words in an ascending numerical order from a heading in the text, wherein the words are stored in the memory unit;
      determining a character string corresponding to the voice signal based on a value obtained by adding the similarity and the connection score which exceeds a threshold value, thereby recognizing connected words which are included in the sentence but not adjacent to each other in the sentence and generating a dictionary that allows precise recognition of voice.

2. The recognizing device according to claim 1, wherein the memory further stores a word string in which a plurality of words are coupled and positional information indicating the position of the word string in the text,
   the comparing includes calculating the similarity using the word string as a word, and
   the calculating the connection score includes calculating the connection score using the word string as a word.

3. The recognizing device according to claim 1, wherein the memory further stores identification information for identifying a sentence so as to be associated with the sentence included in the text, and
   the calculating the connection score includes calculating the connection score indicating the proximity between the plurality of connected words for every sentence based on the positional information and the identification information of the words stored in the memory.

4. The recognizing device according to claim 2, wherein the memory further stores identification information for identifying a sentence so as to be associated with the sentence included in the text, and
   the calculating the connection score includes calculating the connection score indicating the proximity between the plurality of connected words for every sentence based on the positional information and the identification information of the words stored in the memory.

5. The recognizing device according to claim 1, wherein the memory further stores information indicating a probability that a second word is connected to a first word, and
   the calculating the connection score includes further correcting the connection score based on the information indicating the probability that the second word is connected to the first word stored in the memory.

6. The recognizing device according to claim 2, wherein the memory further stores information indicating a probability that a second word is connected to a first word, and
   the calculating the connection score includes further correcting the connection score based on the information indicating the probability that the second word is connected to the first word stored in the memory.

7. The recognizing device according to claim 3, wherein the memory further stores information indicating a probability that a second word is connected to a first word, and
   the calculating the connection score includes further correcting the connection score based on the information indicating the probability that the second word is connected to the first word stored in the memory.

8. The recognizing device according to claim 4, wherein the memory further stores information indicating a probability that a second word is connected to a first word, and
   the calculating the connection score includes further correcting the connection score based on the information indicating the probability that the second word is connected to the first word stored in the memory.

9. The recognizing device according to claim 1, wherein the memory further stores information concerning the suitability of the combination of word classes of the plurality of connected words, and
   the calculating the connection score includes further correcting the connection score based on the information concerning the suitability of the combinations of word classes of the plurality of connected words stored in the memory.

10. A recognizing method that is executed by a computer, the recognizing method comprising:
    storing in memory words included in a text and positional information indicating a position of the words in an ascending numerical order from a heading in the text;
    comparing, using a processor, an input voice signal with reading information of a character string that connects a plurality of the words included in a text and positional information indicating a position of the words in an ascending numerical order from a heading in the text to calculate a similarity;
    calculating a connection score indicating a proximity between the plurality of connected words based on positional information indicating a position of the words in an ascending numerical order from a heading in the text, wherein the words are stored in the memory unit; and
    determining a character string corresponding to the voice signal based on a value obtained by adding the similarity and the connection score which exceeds a threshold value, thereby recognizing connected words which are included in the sentence but not adjacent to each other in the sentence and generating a dictionary that allows precise recognition of voice.

* * * * *